United States Patent
Tami et al.

(10) Patent No.: US 12,430,528 B2
(45) Date of Patent: Sep. 30, 2025

(54) COMPOSITE TWO-DIMENSIONAL CODE AND INFORMATION PROCESSING SYSTEM

(71) Applicant: NHK SPRING CO., LTD., Yokohama (JP)

(72) Inventors: Kenichiro Tami, Yokohama (JP); Naomi Iida, Yokohama (JP); Shinya Nasubida, Yokohama (JP); Go Kinoshita, Yokohama (JP); Haruhito Suga, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 18/381,716

(22) Filed: Oct. 19, 2023

(65) Prior Publication Data

US 2024/0046058 A1    Feb. 8, 2024

Related U.S. Application Data

(63) Continuation of application No. PCT/JP2022/018221, filed on Apr. 19, 2022.

(30) Foreign Application Priority Data

Apr. 20, 2021  (JP) .................. 2021-071296

(51) Int. Cl.
G06K 19/06    (2006.01)

(52) U.S. Cl.
CPC . *G06K 19/06037* (2013.01); *G06K 19/06056* (2013.01); *G06K 19/0614* (2013.01); *G06K 2019/06225* (2013.01)

(58) Field of Classification Search
CPC ....... G06K 19/06037; G06K 19/06056; G06K 19/0614; G06K 2019/06225

USPC ........................................................ 235/494
See application file for complete search history.

(56) References Cited

U.S. PATENT DOCUMENTS

| | | | |
|---|---|---|---|
| 2008/0252066 | A1 | 10/2008 | Rapoport et al. |
| 2020/0151528 | A1 | 5/2020 | Chen |
| 2021/0103786 | A1 | 4/2021 | Yoshida et al. |

FOREIGN PATENT DOCUMENTS

| | | |
|---|---|---|
| JP | S61-217887 A | 9/1986 |
| JP | S63-254586 A | 10/1988 |
| JP | H05-174204 A | 7/1993 |
| JP | H11-221990 A | 8/1999 |
| JP | 2005-165565 A | 6/2005 |

(Continued)

OTHER PUBLICATIONS

Machine translation of JP2011203818, retrieved Nov. 2, 2024 from European Patent Office (Year: 2024).*
Office Action issued on Mar. 12, 2024 for corresponding Japanese Patent Application No. 2023-038619, along with an English machine translation (4 pages).
English translation of Written Opinion issued on Jul. 26, 2022 for corresponding International Patent Application No. PCT/JP2022/018221 (4 pages).

(Continued)

*Primary Examiner* — Suezu Ellis
(74) *Attorney, Agent, or Firm* — Hauptman Ham, LLP

(57) ABSTRACT

A composite two-dimensional code according to an embodiment of the present invention is a combination of a first two-dimensional code and a second two-dimensional code. The composite two-dimensional code includes a first cell having a first color, a second cell having a second color, and a third cell having a third color. The first color, the second color, and the third color are different from each other. The first two-dimensional code is acquired by a first filtering processing. The second two-dimensional code is acquired by a second filtering processing.

16 Claims, 17 Drawing Sheets

(56) References Cited

FOREIGN PATENT DOCUMENTS

| JP | 2005-250865 A | 9/2005 |
| JP | 2005-338669 A | 12/2005 |
| JP | 2008-47081 A | 2/2008 |
| JP | 2009-123179 A | 6/2009 |
| JP | 2010-226580 A | 10/2010 |
| JP | 2011203818 A * | 10/2011 |
| JP | 2012-226710 A | 11/2012 |
| JP | 2015-153228 A | 8/2015 |
| JP | 2015-165342 A | 9/2015 |
| JP | 2018-147379 A | 9/2018 |

OTHER PUBLICATIONS

International Search Report issued on Jul. 26, 2022, for corresponding International Patent Application No. PCT/JP2022/018221, along with an English translation (6 pages).
Written Opinion issued on Jul. 26, 2022, for corresponding International Patent Application No. PCT/JP2022/018221 (4 pages).
Office Action dated May 31, 2023, for corresponding Taiwanese Patent Application No. 111115076, along with an English machine translation (17 pages).
The Extended European Search Report dated Mar. 4, 2025 for corresponding European Patent Application No. 22791740.8 (7 pages).

* cited by examiner

FIG. 10
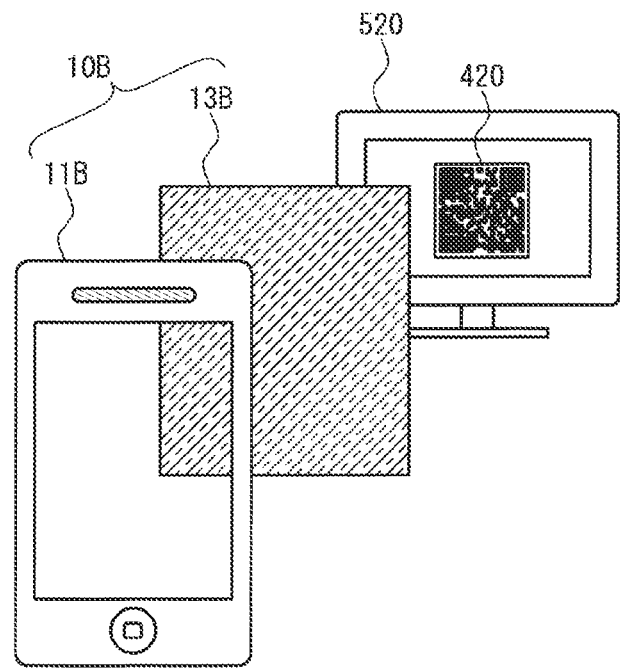
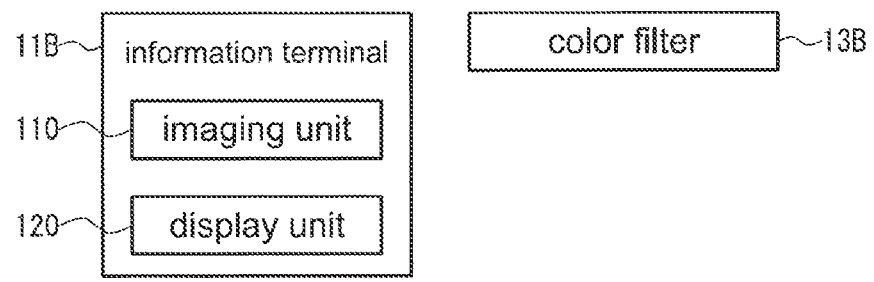

COMPOSITE TWO-DIMENSIONAL CODE AND INFORMATION PROCESSING SYSTEM

CROSS-REFERENCE TO RELATED APPLICATIONS

This application is a Continuation of International Patent Application No. PCT/JP2022/018221, filed on Apr. 19, 2022, which claims the benefit of priority to Japanese Patent Application No. 2021-071296, filed on Apr. 20, 2021, the entire contents of which are incorporated herein by reference.

FIELD

An embodiment of the present invention relates to a composite two-dimensional code in which two-dimensional codes are combined. Further, an embodiment of the present invention relates to a printed matter on which a composite two-dimensional code is printed. Furthermore, an embodiment of the present invention relates to an information processing system of a composite two-dimensional code. Moreover, an embodiment of the present invention relates to a program that executes reading processing of a composite two-dimensional code.

BACKGROUND

A two-dimensional code such as a QR code (registered trademark) includes more information than a one-dimensional barcode, and users can easily obtain a lot of information just by reading the two-dimensional code. Therefore, in recent years, the use of the two-dimensional code has increased in various fields such as process management, inventory management, and payment. For example, Japanese laid-open patent publication No. 2015-165342 discloses a ticket with a two-dimensional code. Furthermore, Japanese laid-open patent publication No. H11-221990 discloses an insurance policy with a two-dimensional code.

SUMMARY

A composite two-dimensional code according to an embodiment of the present invention is a combination of a first two-dimensional code and a second two-dimensional code. The composite two-dimensional code includes a first cell having a first color, a second cell having a second color, and a third cell having a third color. The first color, the second color, and the third color are different from each other. The first two-dimensional code is acquired by a first filtering processing. The second two-dimensional code is acquired by a second filtering processing.

The first filtering processing may be a color reduction processing or a color addition processing of the second color. The second filtering processing may be a color reduction processing or a color addition processing of the first color.

The composite two-dimensional code may further include a first color code having a fourth color, a second color code having a fifth color, and a third color code having a sixth color. The fourth color, the fifth color, and the sixth color may be different from each other. The first two-dimensional code may be acquired by the first filtering processing further including a color correction based on at least one of the first color code, the second color code, or the third color code.

The first color, the second color, and the third color may be identical to the fourth color, the fifth color, and the sixth color, respectively. The fourth color, the fifth color, and the six color may be red, green, and blue, respectively. The fourth color, the fifth color, and the six color may be cyan, magenta, and yellow, respectively.

The first color may be a complementary color of the second color. The third color may be black A printed matter according to an embodiment of the present invention is printed with the composite two-dimensional code.

An information processing system according to an embodiment of the present invention includes a first acquisition section executing a first filtering processing on a composite two-dimensional code including a first cell having a first color, a second cell having a second color, and a third cell having a third color to acquire a first two-dimensional code and a second acquisition section executing a second filtering processing on the composite two-dimensional code to acquire a second two-dimensional code.

The first acquisition section may acquire an RGB value of the second cell from image data of the composite two-dimensional code, execute the first filtering processing of converting a color of the second cell into the third color when the RGB value of the second cell is within a first range based on an RGB value of the second color, and acquire the first two-dimensional code including the second cell and the third cell having the third color. The second acquisition section may acquire an RGB value of the first cell from the image data of the composite two-dimensional code, execute the second filtering processing of converting a color of the first cell into the third color when the RGB value of the first cell is within a second range based on an RGB value of the first color, and acquire the second two-dimensional code comprising the first cell and the third cell having the third color.

The first filtering processing may further convert a color of the second cell not included within the first range and a color of the first cell into a background color of the composite two-dimensional code. The second filtering processing may further convert a color of the first cell not included within the second range and a color of the second cell into the background color of the composite two-dimensional code.

The composite two-dimensional code may further include a first color code having a fourth color, a second color code having a fifth color, and a third color code having a sixth color. The information processing system may further include a calculation section correcting colors of the first cell, the second cell, and the third cell. The calculation section calculates a first difference value between an RGB value of the first color code in the image data and an RGB value of the fourth color, a second difference value between an RGB value of the second color code in the image data and an RGB value of the fifth color, and a third difference value between an RGB value of the third color code in the image data and an RGB value of the sixth color, and correct the colors of the first cell, the second cell, and the third cell based on at least one of the first difference value, the second difference value, or the third difference value.

The first acquisition section may execute the first filtering processing of converting the second cell having the second color on image data of the composite two-dimensional code to acquire the first two-dimensional code including the first cell having the first color and the third cell having the third color, and acquire first count information about a number of the first cells having the first color included in the composite two-dimensional code based on the acquired first two-dimensional code. The second acquisition section may execute the second filtering processing of converting the first cell having the first color on the image data, acquire second count information about a number of the converted first cells having the first color, and acquire the second two-dimensional code including the second cell having the second color and the third cell having the third color when the second count information satisfies a predetermined condition including the first count information.

The predetermined condition may be that the second count information is greater than or equal to (1−a) times the first count information and less than or equal to (1+a) times the first count information and a may be a preset value.

The first acquisition section may execute the first filtering processing of converting the second cell having the second color on image data of the composite two-dimensional code to acquire the first two-dimensional code including the first cell having the first color and the third cell having the third color, and acquire first percentage information about a percentage of the first cells having the first color to the composite two-dimensional code based on the acquired first two-dimensional code. The second acquisition section may execute the second filtering processing of converting the first cell having the first color on the image data, acquire second percentage information about a percentage of the converted first cell having the first color, and acquire the second two-dimensional code including the second cell having the second color and the third cell having the third color when the second percentage information satisfies a predetermined condition including the first percentage information.

The predetermined condition is that the second percentage information may be greater than or equal to (1−a) times the first percentage information and less than or equal to (1+a) times the first count information, and a may be a preset value.

A program according to an embodiment of the present invention is executed on a computer. The program includes executing a first filtering processing on a composite two-dimensional code comprising a first cell having a first color, a second cell having a second color, and a third cell having a third color to acquire a first two-dimensional code, and performing a second filtering processing on the composite two-dimensional code to acquire a second two-dimensional code.

The first filtering processing may include acquiring an RGB value of the second cell from image data of the composite two-dimensional code and converting a color of the second cell into the third color when the RGB value of the second cell is within a first range based on an RGB value of the second color. The second filtering processing may include acquiring an RGB value of the first cell from the image data of the composite two-dimensional code and converting a color of the first cell into the third color when the RGB value of the first cell is within a second range based on an RGB value of the first color. The first two-dimensional code may include the second cell and the third cell having the third color. The second two-dimensional code may include the first cell and the third cell having the third color.

The composite two-dimensional code may further include a first color code having a fourth color, a second color code having a fifth color, and a third color code having a sixth color. The program may further include calculating a first difference value between an RGB value of the first color code in the image data and an RGB value of the fourth color, a second difference value between an RGB value of the second color code in the image data and an RGB value of the fifth color, and a third difference value between an RGB value of the third color code in the image data and an RGB value of the sixth color and correcting the colors of the first cell, the second cell, and the third cell based on at least one of the first difference value, the second difference value, or the third difference value.

The program may include may executing the first filtering processing of converting the second cell having the second color on image data of the composite two-dimensional code to acquire the first two-dimensional code including the first cell having the first color and the third cell having the third color, and acquiring first count information about a number of the first cell having the first color included in the composite two-dimensional code based on the acquired first two-dimensional code and executing the second filtering processing of converting the first cell having the first color on the image data, acquiring second count information about a number of the converted first cells having the first color, and acquiring the second two-dimensional code including the second cell having the second color and the third cell having the third color when the second count information satisfies a predetermined condition including the first count information.

The program may include executing the first filtering processing of converting the second cell having the second color on image data of the composite two-dimensional code to acquire the first two-dimensional code including the first cell having the first color and the third cell having the third color, and acquiring first percentage information about a percentage of the first cell having the first color to the composite two-dimensional code based on the acquired first two-dimensional code, and executing the second filtering processing of converting the first cell having the first color on the image data, acquiring second percentage information about a percentage of the converted first cell having the first color, and acquiring the second two-dimensional code including the second cell having the second color and the third cell having the third color when the second percentage information satisfies a predetermined condition including the first percentage information.

BRIEF DESCRIPTION OF DRAWINGS

FIG. 10 is a schematic diagram illustrating a configuration of an information processing system that performs the reading processing of the composite two-dimensional code according to an embodiment of the present invention.

DESCRIPTION OF EMBODIMENTS

Figure 1:
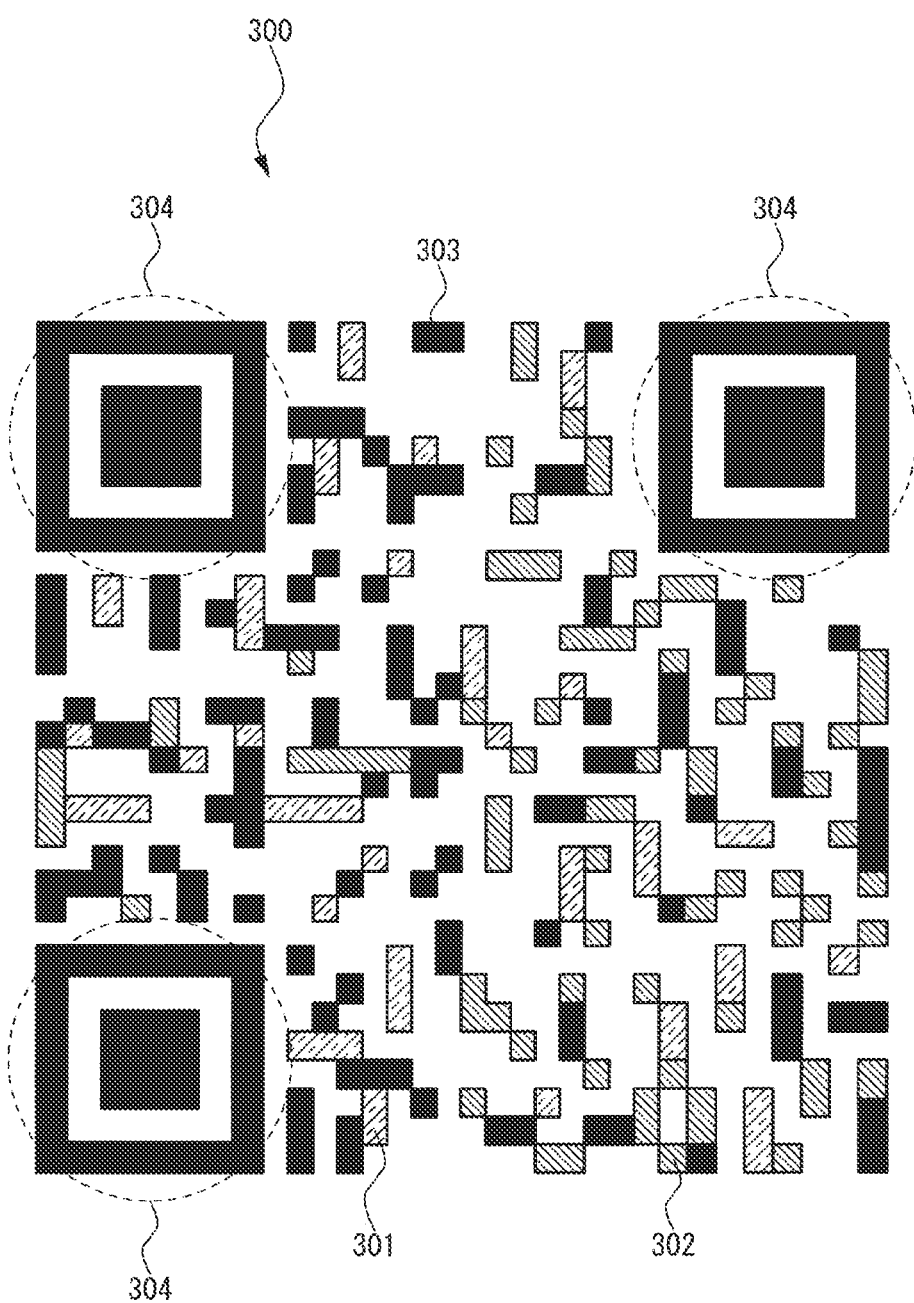
FIG. 1 is a schematic diagram showing a configuration of a composite two-dimensional code according to an embodiment of the present invention.

Two-dimensional codes are often copied by a copying machine and used illegally (i.e., two-dimensional codes are forged). Therefore, in order to prevent the forgery of two-dimensional codes, Japanese laid-open patent publication No. 2015-165342 discloses a two-dimensional code that uses inks with different reflective properties. Further, Japanese laid-open patent publication No. H11-221990 discloses a two-dimensional code that is attached with a dummy image when it is copied.

The main purpose of Japanese laid-open patent publication Nos. 2015-165342 and H11-221990 is to prevent the forgery of the two-dimensional code of the printed matter that is reproduced by the copying machine. In other words, the purpose is to prevent mechanical duplication. However, in recent years, after the two-dimensional code is read by information terminals such as smartphones, the read electronic data itself is increasingly used. Therefore, in the use of the two-dimensional code, it is required to prevent not only mechanical duplication but also electronic duplication.

In view of the above problems, one object of an embodiment of the present invention is to provide a composite two-dimensional code that can prevent mechanical and electronic duplication. Further, one object of an embodiment of the present invention is to provide a method for generating a composite two-dimensional code that can prevent mechanical and electronic duplication. Furthermore, one object of an embodiment of the present invention is to provide a printed matter printed with a composite two-dimensional code that can prevent mechanical and electronic duplication. Moreover, one object of an embodiment of the present invention is to provide an information processing system that executes a reading processing of a composite two-dimensional code that can prevent mechanical and electronic duplication. Additionally, one object of an embodiment of the present invention is to provide a program that executes a reading processing of a composite two-dimensional code that can prevent mechanical and electronic duplication.

Since a composite two-dimensional code according to an embodiment of the present invention includes a plurality of two-dimensional codes, the composite two-dimensional code can include more information than one two-dimensional code. Further, since the composite two-dimensional code includes cells of multiple colors, it is not easy to mechanically reproduce the color or shape accurately. Furthermore, in the composite two-dimensional code, information can only be obtained by executing a filtering processing to separate the combined two-dimensional code into individual codes. Therefore, the composite two-dimensional code can prevent not only mechanical duplication but also electronic duplication.

Each embodiment of the present invention is described below while referring to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the specification and the drawings, the same reference numerals are provided to the same elements as those described previously with reference to preceding figures and repeated explanations may be omitted accordingly.

In the specification and the drawings, the same reference numerals may be used when multiple configurations are identical or similar in general, and reference numerals with an upper case letter of the alphabet may be used when the multiple configurations are distinguished. Further, reference numerals with a hyphen and a natural number may be used when multiple portions of one configuration are distinguished.

In the specification, terms such as "first", "second", or "third" attached to each configuration are convenient terms used to distinguish each configuration, and have no further meaning unless otherwise explained.

In the specification, "two-dimensional code" refers to a code in a two-dimensional display format that has information in the horizontal and vertical directions. For example, although the two-dimensional code is a QR code (registered trademark), the two-dimensional code is not limited thereto.

First Embodiment

A composite two-dimensional code 300 according to an embodiment of the present invention is described with reference to FIGS. 1 to 7.

[1. Configuration of Two-Dimensional Code]

FIG. 1 is a schematic diagram showing a configuration of the composite two-dimensional code 300 according to an embodiment of the present invention.

As shown in FIG. 1, the composite two-dimensional code 300 includes a plurality of first cells 301 having a first color, a plurality of second cells 302 having a second color, and a plurality of third cells 303 having a third color. Further, the composite two-dimensional code 300 shown in FIG. 1 includes three cutout symbols 304 having a third color.

The three cutout symbols 304 are arranged at positions corresponding to corners of a square. The cutout symbol 304 serves as a reference for reading the two-dimensional code. That is, when a two-dimensional code 304 is read, it is possible to identify a predetermined two-dimensional code by detecting the position, inclination, or size of the three cutout symbols 304. Therefore, the cutout symbol 304 can also be called a position detection pattern. In addition, the number of the cutout symbols 304 is not limited to three. The number of the cutout symbols 304 may be one, for example.

The plurality of first cells 301, the plurality of second cells 302, and the plurality of third cells 303 are arranged horizontally and vertically within a rectangular area surrounded by the three cutout symbols 304. Information included in the two-dimensional code is determined by the arrangement of the first cells 301, the second cells 302, or the third cells 303.

The composite two-dimensional code 300 shown in FIG. 1 is a so-called QR code (registered trademark). In the following description, although the composite two-dimensional code 300 is described as a QR code (registered trademark) for convenience, the composite two-dimensional code 300 is not limited to the QR code (registered trademark).

The first color, the second color, and the third color are arbitrary colors that are different from each other. However, it is preferable that the first color is a complementary color of the second color. For example, when the first color is red, the second color is blue-green. For example, when the first color is reddish-purple, the second color is green. Further, it is preferable that the third color has a difference in hue, saturation, or lightness from both of the first color and the second color. For example, when the first color is a complementary color of the second color, the third color is black. In addition, the composite two-dimensional code 300 includes a background color different from the first color, the second color, and the third color. Although it is preferable that the background color is white, the background color is not limited thereto. The background color may be transparent.

Figure 2A:
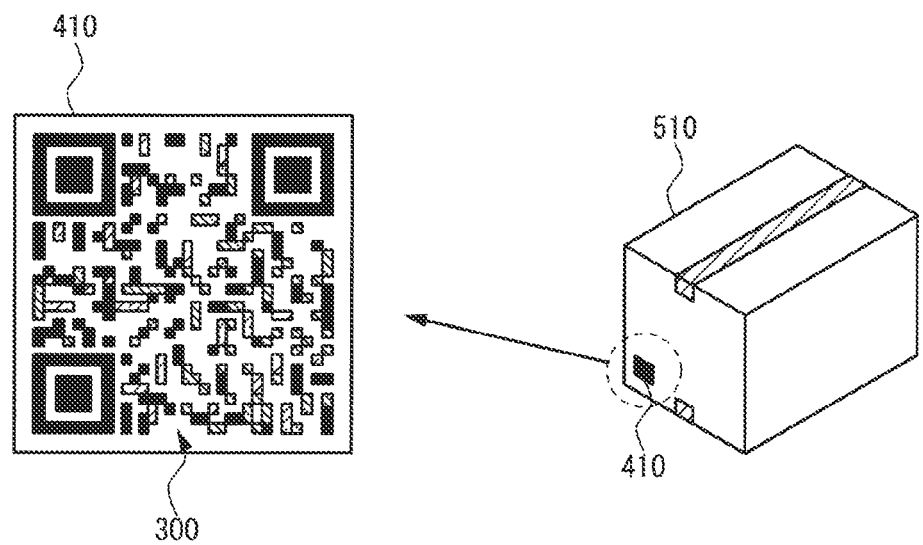
FIG. 2A is a schematic diagram showing an example of the use of a composite two-dimensional code according to an embodiment of the present invention.
Figure 2B:
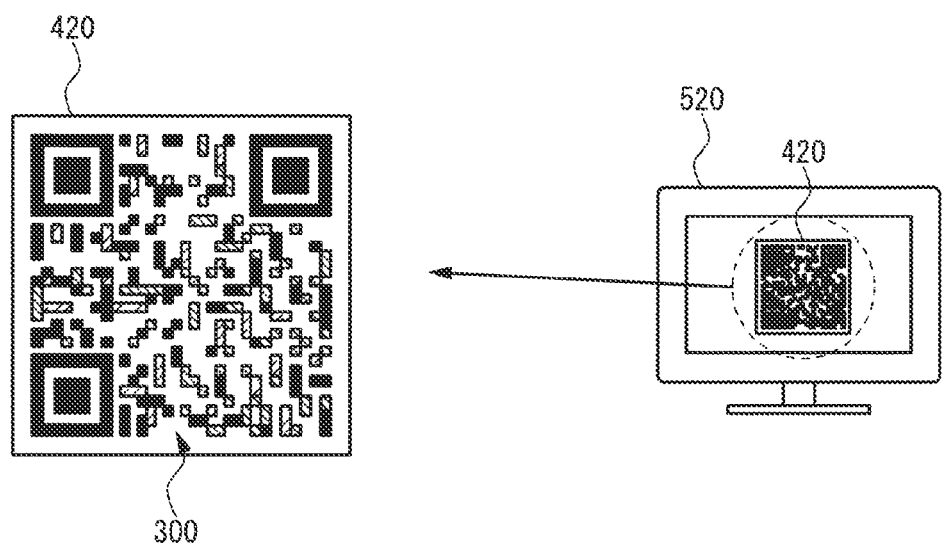
FIG. 2B is a schematic diagram showing an example of the use of a composite two-dimensional code according to an embodiment of the present invention.

FIGS. 2A and 2B are schematic diagrams showing an example of the use of the composite two-dimensional code 300 according to an embodiment of the present invention.

FIG. 2A shows an example in which the composite two-dimensional code 300 is printed on a printed matter 410 and the printed matter 410 is attached to an article 510. In this case, the composite two-dimensional code 300 can include information on the article 510. Since the composite two-dimensional code 300 includes the information on the article 510, the information on the article 510 can be acquired by reading the information of the composite two-dimensional code 300 from the printed matter 410 attached to the article 510.

Although the printed matter 410 is, paper or a film, for example, the printed matter 410 is not limited thereto. Further, although a letterpress method, a planographic method, an intaglio method, a stencil method, an electrophotographic method, an inkjet method, a laser method, or the like can be used as a means for printing the composite two-dimensional code 300 on the printed matter 410, for example, the printing means for the composite two-dimensional code 300 is not limited thereto. Furthermore, although letterpress ink, planographic ink, screen ink, thermosetting ink, ultraviolet curing ink, magnetic ink, UV fluorescent ink, or the like can be used in printing the composite two-dimensional code 300, the ink is not limited thereto.

In addition, the composite two-dimensional code 300 may be printed directly on the article 510 without using the printed matter 410. Further, the composite two-dimensional code 300 may include information other than the article 510.

FIG. 2B is an example in which the composite two-dimensional code 300 is displayed as an image 420 on a display device 520. In this case, the composite two-dimensional code 300 can include any information depending on the manner in which the image 420 is used. For example, when the image 420 is used for payment, the composite two-dimensional code 300 may include payment information. The user can read the payment information of the composite two-dimensional code 300 from the image 420 and execute the payment processing.

The display device 520 is a display interface that can display data or information. For example, a liquid crystal display device or an OLED (Organic Light-Emitting Diode) display device can be used as the display device 520.

As described above, although the composite two-dimensional code 300 is used by being printed on the printed material 410 or the article 510, or displayed on the image 420, in any case, information included in the composite two-dimensional code 300 can be acquired by reading the composite two-dimensional code 300.

The composite two-dimensional code 300 is a combination of two two-dimensional codes. Therefore, the composite two-dimensional code 300 can include approximately twice as much information as one two-dimensional code. In the composite two-dimensional code 300, one piece of information may be divided into two pieces of information to include them in two two-dimensional codes, or two pieces of information may be included in two two-dimensional codes. When the composite two-dimensional code 300 includes the two pieces of information, the two pieces of information may be mutually related information, or may be mutually unrelated and independent information. Hereinafter, the reading processing of the composite two-dimensional code 300 is described.

[2. Reading Processing of Composite Two-Dimensional Code 300]

Figure 3:
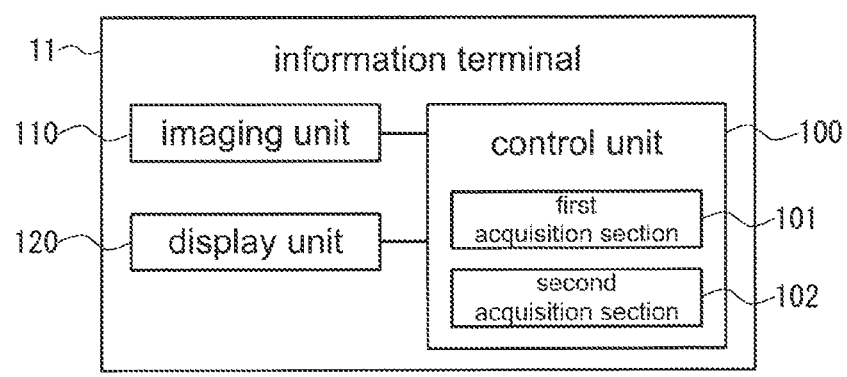
FIG. 3 is a block diagram showing a configuration of an information processing system that executes a reading processing of a composite two-dimensional code according to an embodiment of the present invention.

FIG. 3 is a block diagram showing a configuration of an information processing system 10 that executes a reading processing of the composite two-dimensional code 300 according to an embodiment of the present invention.

The information processing system 10 includes an information terminal 11 that can read the composite two-dimensional code 300. For example, although the information terminal 11 is a mobile phone, a smartphone, a tablet, or a personal computer, the information terminal 11 is not limited thereto. Specifically, the information processing system 10 can use the information terminal 11 to capture a printed matter 410, article 510, or image 420 that includes the composite two-dimensional code 300 and acquire a regular two-dimensional code from the captured composite two-dimensional code 300.

In the information processing system 10, a two-dimensional code generation processing can be executed by installing a program in the information terminal 11. Further, in the information processing system 10, the information terminal 11 can execute the two-dimensional code generation processing by reading a recording medium (for example, a CD-ROM or a DVD-ROM) in which a program is stored.

As shown in FIG. 3, the information processing system 10 includes a control unit 100, an imaging unit 110, and a display unit 120. Further, the control unit 100 includes a first acquisition section 101 and a second acquisition section 102.

The control unit 100 is a computer that can execute arithmetic processing using data or information. For example, the control section 100 includes a central processing unit (CPU), a micro processing unit (MPU), a graphics processing unit (GPU), or a random access memory (RAM) etc. Specifically, the control unit 100 can execute a program and cause the first acquisition unit 101 and the second acquisition unit 102 to function. In addition, details of the first acquisition unit 101 and the second acquisition unit 102 are described later.

The imaging unit 110 is an imaging device that can capture the printed matter 410, the article 510, or the image 420. Specifically, the imaging unit 110 can capture the printed matter 410, the article 510, or the image 420 including the composite two-dimensional code 300 to generate image data 310 including the composite two-dimensional code 300. For example, a camera or a scanner can be used as the imaging unit 110.

The display unit 120 is a display interface that can display the captured printed matter 410, article 510, or image 420 including the composite two-dimensional code 300. For example, a liquid crystal display device, an O LED display device, or the like can be used as the display unit 120.

The first acquisition section 101 executes a first filtering processing and acquires a first two-dimensional code from the image data 310. The first filtering processing is a color reduction processing for the second color. Specifically, the color reduction processing for the second color is a processing for converting the second color into a background color. When the first filtering processing is executed on the image data 310, the second color is converted to the background color, and the second cells 302 having the second color can be erased. Therefore, the image data 310 is converted into the first two-dimensional code including the plurality of first cells 301 having the first color, the plurality of third cells 303 having the third color, and the three cutout symbols 304 by the first filtering processing.

In addition, the first filtering processing may be a processing of adding a second color to the image data 310. Specifically, the second color addition processing is a processing of converting the background color into the second color. In this case, since the background of the image data 310 and the second cells 302 have the same second color, the second cells 302 can be deleted as a result.

Further, in the first filtering processing, a processing of converting the first color of the first cells 301 may be executed. For example, the first color may be converted to the third color by the first filtering processing.

The second acquisition section 102 executes a second filtering processing and acquires a second two-dimensional code from the image data 310. The second filtering processing is a color reduction processing for the first color. Specifically, the first color reduction processing is a processing of converting the first color into the background color. When the first filtering processing is executed on the image data 310, the first color is converted to the background color, and the first cells 301 having the first color can be erased. Therefore, the image data 310 is converted into the second two-dimensional code including a plurality of second cells 302 having the second color, a plurality of third cells 303 having the third color, and three cutout symbols 304 by the second filtering processing.

In addition, the second filtering processing may be a processing of adding the first color to the image data 310. Specifically, the first color addition processing is a processing of converting the background color into the first color. In this case, since the background of the image data 310 and the first cells 301 have the same first color, the first cells 301 can be deleted as a result.

Further, in the second filtering processing, a processing of converting the second color of the second cells 302 may be executed. For example, the second color may be converted into the third color by the first filtering processing.

Figure 4:
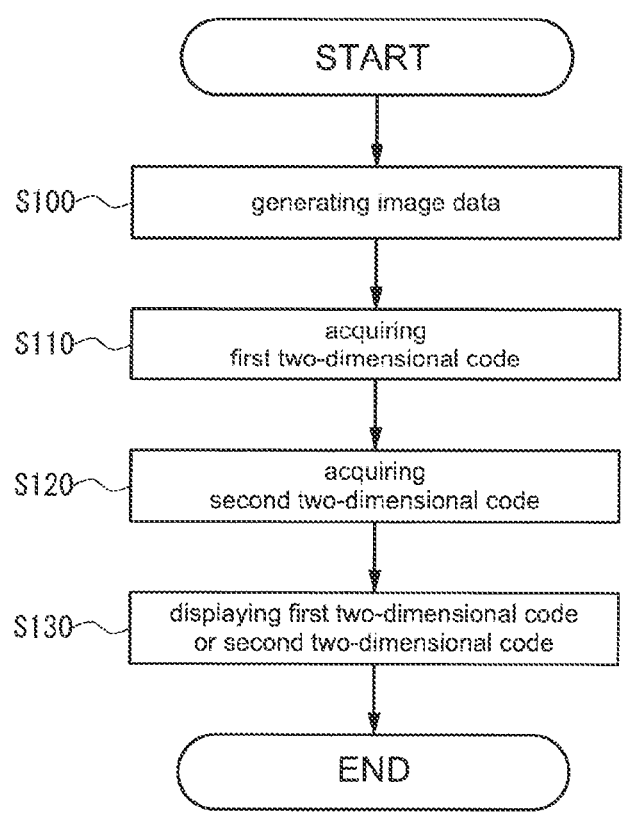
FIG. 4 is a flowchart of a reading processing of a composite two-dimensional code 300 according to an embodiment of the present invention.
Figure 5:
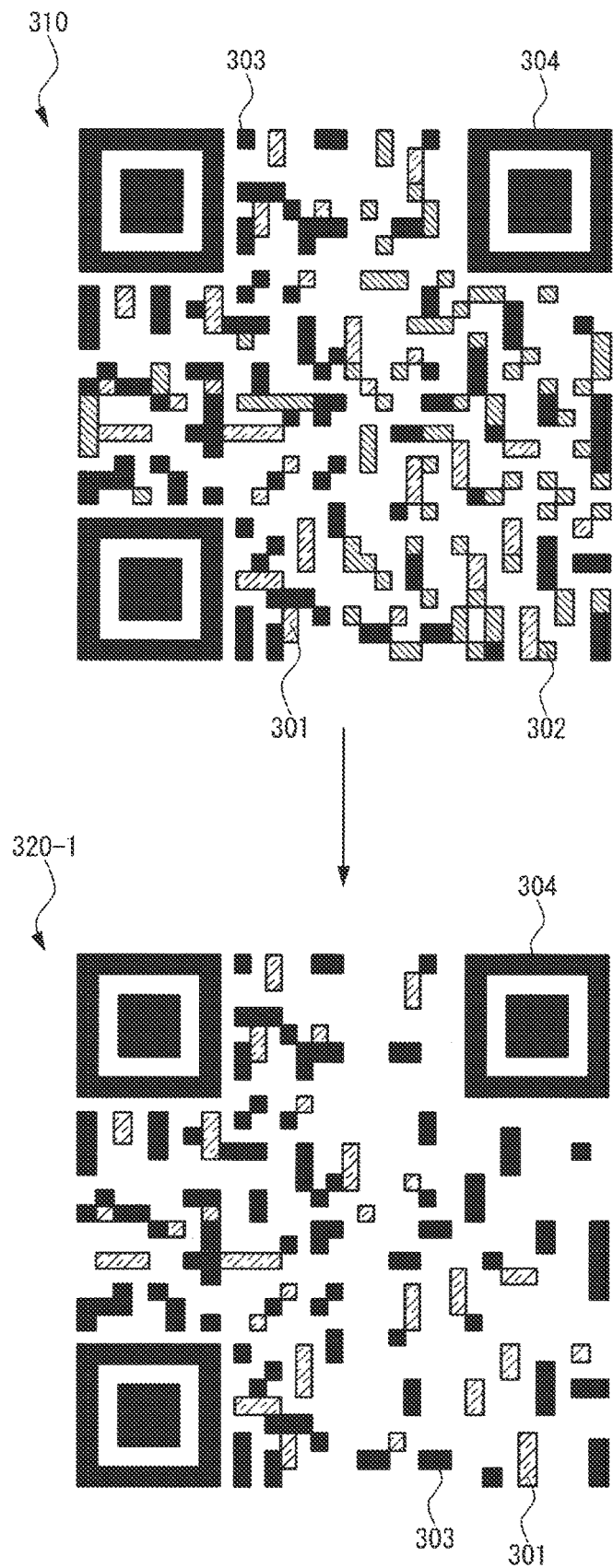
FIG. 5 is a schematic diagram illustrating a first acquisition processing for acquiring a first two-dimensional code from a composite two-dimensional code according to an embodiment of the present invention.
Figure 6:
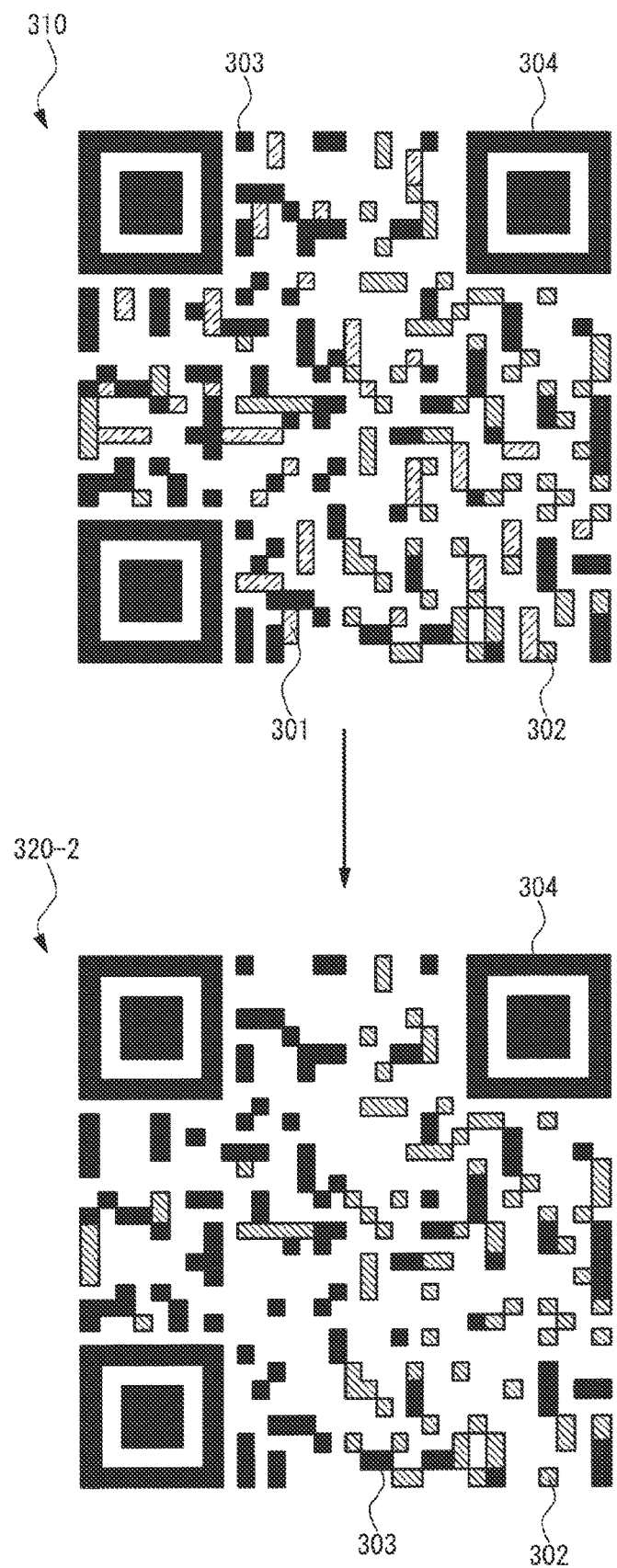
FIG. 6 is a schematic diagram illustrating a second acquisition processing for acquiring a second two-dimensional code from a composite two-dimensional code according to an embodiment of the present invention.

FIG. 4 is a flowchart of a reading processing of the composite two-dimensional code 300 according to an embodiment of the present invention. Further, FIG. 5 is a schematic diagram illustrating a first acquisition processing for acquiring the first two-dimensional code 320-1 from the composite two-dimensional code 300 according to an embodiment of the present invention. Furthermore, FIG. 6 is a schematic diagram illustrating a second acquisition processing for acquiring the second two-dimensional code 320-2 from the composite two-dimensional code 300 according to an embodiment of the present invention.

The processing of reading the composite two-dimensional code 300 starts when a program for reading the composite two-dimensional code 300 is executed in the information processing system 10.

In step S100, the imaging unit 110 generates the image data 310 from the printed matter 410, the article 510, or the image 420 that includes the composite two-dimensional code 300. For example, when a user captures the printed matter 410, the article 510, or the image 420 using the imaging unit 110 of the information processing system 10, the imaging unit 110 can generate the image data 310.

In step S110, the first acquisition section 101 executes the first filtering processing on the image data 310 and acquires a first two-dimensional code 320-1 from the image data 310. As shown in FIG. 5, when a second color reduction processing is executed on the image data 310 as the first filtering processing, and a first two-dimensional code 320-1 in which the second cells 302 having the second color are deleted is generated. That is, the first two-dimensional code 320-1 includes the plurality of first cells 301 having the first color, the plurality of third cells 303 having the third color, and three cutout symbols 304 having the third color.

In step S120, the second acquisition section 102 executes a second filtering processing on the image data 310 and acquires a second two-dimensional code 320-2 from the image data 310. As shown in FIG. 6, when the first color reduction processing is executed on the image data 310 as the second filtering processing, a second two-dimensional code 320-2 in which the first cells 301 having the first color are deleted is generated. That is, the second two-dimensional code 320-2 includes the plurality of second cells 302 having the second color, the plurality of third cells 303 having the third color, and three cutout symbols 304 having the third color.

In step S130, the display unit 120 displays the first two-dimensional code 320-1 or the second two-dimensional code 320-2. The user can obtain the information included in the first two-dimensional code 320-1 or second two-dimensional code 320-2 based on the displayed first two-dimensional code 320-1 or second two-dimensional code 320-2.

The processing of reading the composite two-dimensional code 300 ends when step S130 is executed.

Modification 1 of First Embodiment

In the reading processing of the composite two-dimensional code 300 according to First Embodiment described above, the first acquisition section 101 and the second acquisition section 102 read the first two-dimensional code 320-1 and the second two-dimensional code 320-2, respectively. In this modification, the first acquisition section 101 further acquires the information included in the first two-dimensional code 320-1 in step S110, and the second acquisition section 102 further acquires the information included in the second two-dimensional code 320-2 in step S120. In this case, in step S130, the display unit 120 displays the information included in the first two-dimensional code 320-1 or the information included in the second two-dimensional code 320-2 instead of the first two-dimensional code 320-1 or the second two-dimensional code 320-2. The user can directly obtain the information included in the composite two-dimensional code 300 from the composite two-dimensional code 300.

In addition, the information provided to the user is not limited to the information included in the first two-dimensional code 320-1 or the second two-dimensional code 320-2. Information associated with the information included in the first two-dimensional code 320-1 or the second two-dimensional code 320-2, or information derived from the information included in the first two-dimensional code 320-1 or the second two-dimensional code 320-2 (for example, information of the result of the authenticity determination of the article 510, etc.) can be provided to the user. In the following description, for convenience, the information may be described as information accompanying the two-dimensional code.

As described above, the two two-dimensional codes 320 (the first two-dimensional code 320-1 and the second two-dimensional code 320-2) can be obtained from the composite two-dimensional code 320 by using the information processing system 10. The two two-dimensional codes 320 may include mutually related information or may include unrelated and independent information. In the following description, a generation processing of the composite two-dimensional code 300 is described.

[3. Generation Processing of Composite Two-Dimensional Code]

Figure 7:
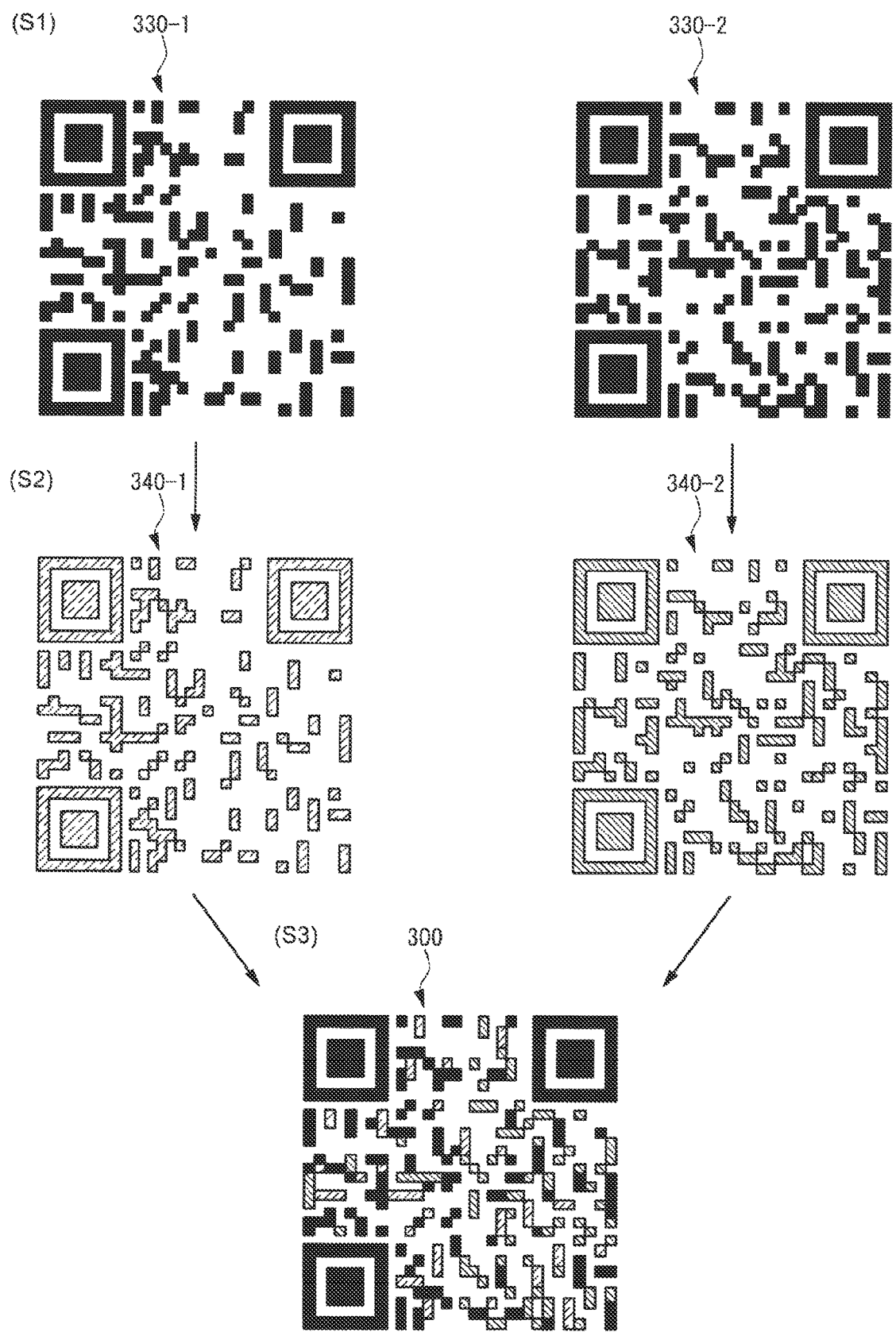
FIG. 7 is a schematic diagram illustrating a generation processing of a composite two-dimensional code according to an embodiment of the present invention.

FIG. 7 is a schematic diagram illustrating a generation processing of the composite two-dimensional code 300 according to an embodiment of the present invention.

As shown in (S1) of FIG. 7, the first two-dimensional code 330-1 including first information and the second two-dimensional code 330-2 including second information are generated.

Next, as shown in (S2) of FIG. 7, the first two-dimensional code 330-1 is converted into the first color. As a result, a first two-dimensional code 340-1 including the plurality of first cells having the first color and three cutout symbols is generated. Similarly, the second two-dimensional code 330-2 is converted to the second color. As a result, a second two-dimensional code 340-2 including the plurality of second cells having the second color and three cutout symbols is generated.

Next, as shown in (S3) of FIG. 7, the first two-dimensional code 340-1 and the second two-dimensional code 340-2 are combined. Specifically, the first two-dimensional code 340-1 and the second two-dimensional code 340-2 are combined to overlap the three cut out symbols of each of the first two-dimensional code 340-1 and the second two-dimensional code 340-2. At this time, the third cell in which the first cell of the first two-dimensional code 340-1 and the second cell of the second two-dimensional code 340-2 overlap each other is converted to the third color. Since the three cutout symbols of each of the first two-dimensional code 340-1 and the second two-dimensional code 340-2 also overlap each other, the three cutout symbols are also converted to the third color. In this manner, the composite two-dimensional code 300 that includes the plurality of first cells having the first color, the plurality of second cells having the second color, the plurality of third cells having the third color, and the three cutout symbols having the third color is generated.

As described above, the generated composite two-dimensional code 300 is used by being printed on the printed matter 410 or the article 510, or displayed as the image 420.

Modification 2 of First Embodiment

Although the composite two-dimensional code 300 described above is a code in which the first two-dimensional code 320-1 and the second two-dimensional code 320-2 (in the generation of the composite two-dimensional code 300, the first two-dimensional code 340-1 and the second two-dimensional code 340-2) are combined, the composite two-dimensional code 300 may be a code in which three or more two-dimensional codes are combined. When n two-dimensional codes 320 (n is a natural number of 2 or more) are combined, the composite two-dimensional code 300 includes cells having n+1 or more types of colors.

As described above, since the composite two-dimensional code 300 according to the present embodiment includes the plurality of two-dimensional codes, the composite two-dimensional code 300 can include more information than one two-dimensional code. Further, since the composite two-dimensional code 300 includes cells having multiple colors, it is not easy to accurately and mechanically duplicate the colors or shapes. Furthermore, in the composite two-dimensional code 300, information can only be obtained by executing the filtering processing to separate the combined two-dimensional code into individual codes. Therefore, the composite two-dimensional code 300 is a two-dimensional code that can prevent not only mechanical duplication but also electronic duplication.

Second Embodiment

A reading processing of the composite two-dimensional code 300, which is different from First Embodiment, is described with reference to FIGS. 8 and 9. Specifically, in this embodiment, the reading processing of the composite two-dimensional code 300 is executed using an information processing system 10A instead of the information processing system 10. In addition, when a configuration of the information processing system 10A is similar to the configuration of the information processing system 10, the description thereof may be omitted.

Figure 8:
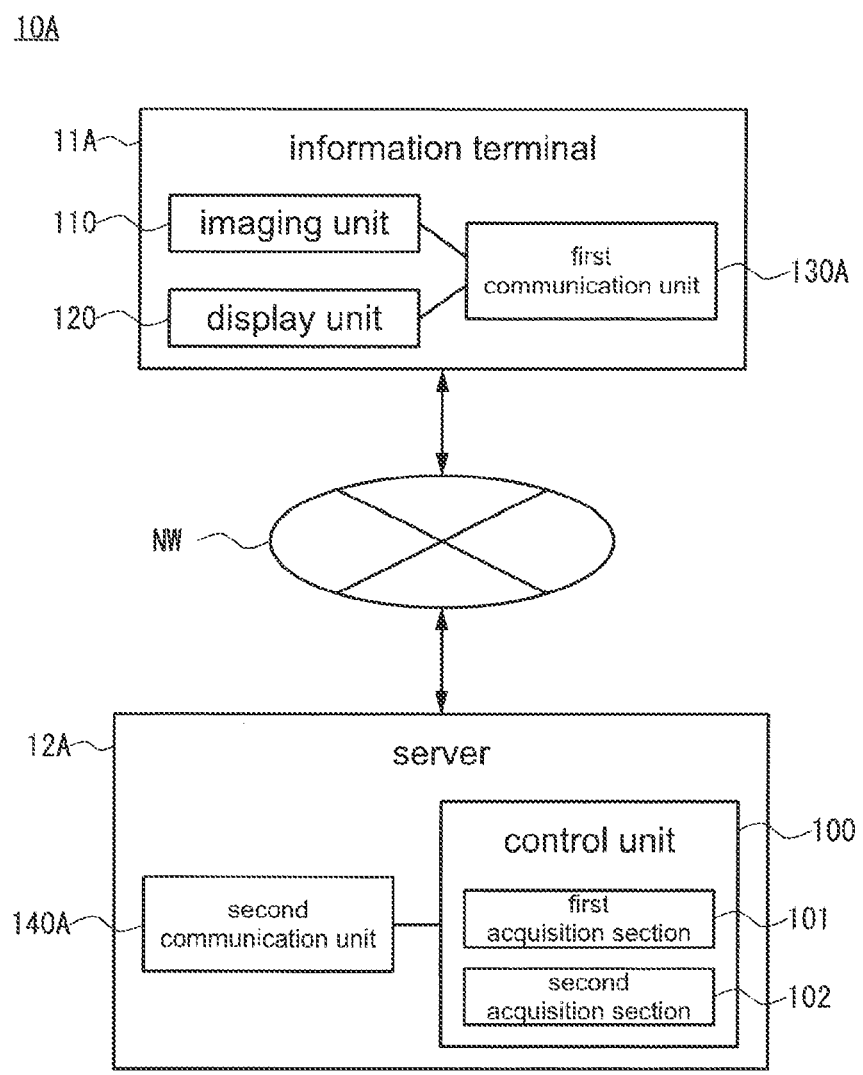
FIG. 8 is a block diagram showing a configuration of an information processing system that executes a reading processing of a composite two-dimensional code according to an embodiment of the present invention.

FIG. 8 is a block diagram showing a configuration of the information processing system 10A that executes a reading processing of the composite two-dimensional code 300 according to an embodiment of the present invention.

The information processing system 10A includes an information terminal 11A and a server 12A. The information terminal 11A can be communicatively connected to the server 12A via a network NW. The network NW may be wired or wireless. For example, the network NW is a LAN (Local Area Network) or the Internet, although the network NW is not limited thereto.

The information terminal 11A is a terminal that can capture the printed matter 410, the article 510, or the image 420 including the composite two-dimensional code 300, and generate the image data 310. Although the information terminal 11A is, for example, a mobile phone, a smartphone, a tablet, or a personal computer, the information terminal 11A is not limited thereto.

The server 12A is a software or a computer that is provided with the image data 310 from the information terminal 11A and can acquire the first two-dimensional code 320-1 and the second two-dimensional code 320-2. In addition, when the server 12A is a computer, the server 12A may be one computer or multiple computers.

As described above, the information processing system 10A includes the information terminal 11A and the server 12A, and the image data 310 generated by the information terminal 11A is transmitted to the server 12A. The server 12A acquires the first two-dimensional code 320-1 and the second two-dimensional code 320-2 from the transmitted image data 310. In addition, the information processing system 10A can also acquire the first two-dimensional code 320-1 and the second two-dimensional code 320-2 using a cloud computing method or an ASP (Application Service Provider) method.

As shown in FIG. 8, the information terminal 11A of the information processing system 10A includes the imaging unit 110, the display unit 120, and a first communication unit 130A. The server 12A of the information processing system 10A includes the control unit 100 and a second communication unit 140A. Further, the control unit 100 includes the first acquisition section 101 and the second acquisition section 102.

The first communication unit 130A and the second communication unit 140A are communication interfaces that can transmit or receive data or information via wire or wirelessly. For example, a LAN module or a Wi-Fi (registered trademark) module can be used as the first communication unit 130A and the second communication unit 140A.

Figure 9:
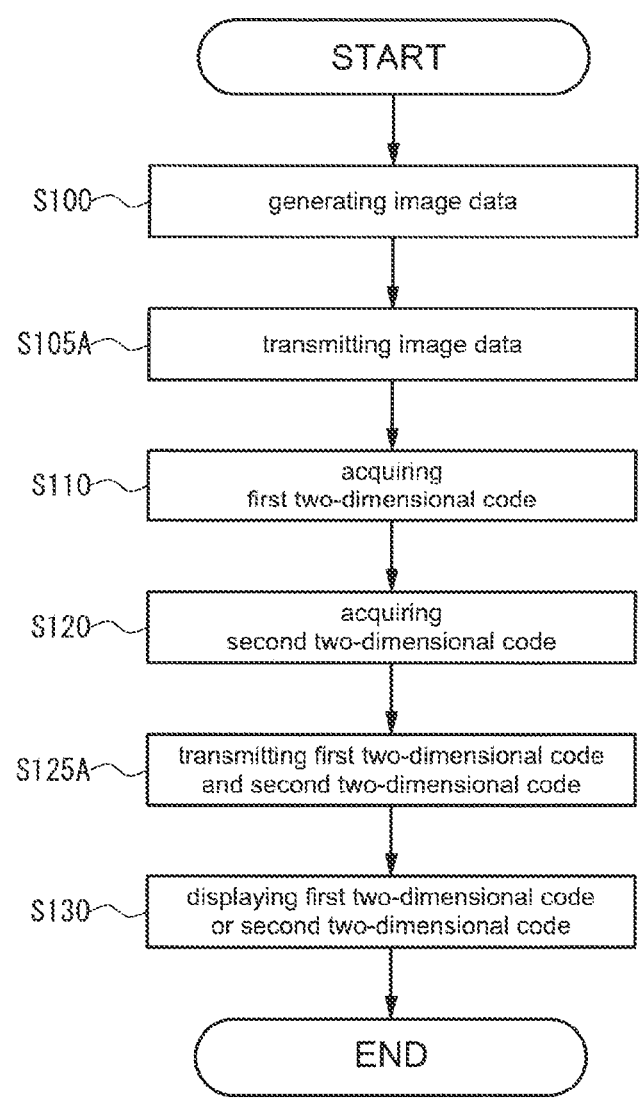
FIG. 9 is a flowchart of a reading processing of a composite two-dimensional code according to an embodiment of the present invention.

FIG. 9 is a flowchart of a reading processing of the composite two-dimensional code 300 according to an embodiment of the present invention.

The reading processing of the composite two-dimensional code 300 starts when a program for reading the composite two-dimensional code 300 is executed in the information terminal 11A.

In step S100, the imaging unit 110 generates the image data 310 from the printed matter 410, the article 510, or the image 420 that includes the composite two-dimensional code 300.

In step S105A, the first communication unit 130A transmits the image data 310. The transmitted image data 310 is received by the second communication unit 140A.

In step S110, the first acquisition section 101 executes the first filtering processing on the image data 310 and acquires the first two-dimensional code 320-1 from the image data 310.

In step S120, the second acquisition section 102 executes the second filtering processing on the image data 310 and acquires the second two-dimensional code 320-2 from the image data 310.

In step S125A, the second communication unit 140A transmits the first two-dimensional code 320-1 and the second two-dimensional code 320-2. The transmitted first two-dimensional code 320-1 and second two-dimensional code 320-2 are received by the first communication unit 130A.

In step S130, the display unit 120 displays the first two-dimensional code 320-1 or the second two-dimensional code 320-2.

The reading processing of the composite two-dimensional code 300 ends when step S130 is executed.

Modification of Second Embodiment

In the reading processing of the composite two-dimensional code 300 according to the Second Embodiment described above, the server 12A acquires the first two-dimensional code 320-1 and the second two-dimensional code 320-2, and the acquired first two-dimensional code 320-1 and second two-dimensional code 320-2 are transmitted to the information terminal 11A. In this modification, the server 12A acquires the information included in the first two-dimensional code 320-1 and the information included in the second two-dimensional code 320-2, and the information included in the acquired first two-dimensional code 320-1 and second two-dimensional code 320-2 can be transmitted to the information terminal 11A. In this case, in step S130, the display unit 120 displays the information included in the first two-dimensional code 320-1 or the information included in the first two-dimensional code 320-1 instead of the first two-dimensional code 320-1 or the second two-dimensional code 320-2. The user can directly obtain the information included in the composite two-dimensional code 300 from the composite two-dimensional code 300. In addition, the information transmitted from the server 12A to the information terminal 11A and the information displayed on the display unit 120 may be information accompanying the first two-dimensional code 320-1 or the second two-dimensional code.

As described above, even in the reading processing of the composite two-dimensional code 300 according to this embodiment, information can only be obtained by executing the filtering processing to separate the combined two-dimensional code into individual codes. Therefore, not only mechanical duplication of the two-dimensional code but also electronic duplication of the two-dimensional code can be prevented.

Third Embodiment

A reading process of the composite two-dimensional code 300, which is different from the First Embodiment, is further described with reference to FIGS. 10 and 11. Specifically, in this embodiment, the reading processing of the composite two-dimensional code 300 is performed using an information processing system 10B instead of the information processing system 10. In addition, when a configuration of the information processing system 10B is similar to the configuration of the information processing system 10, the description thereof may be omitted.

FIG. 10 is a schematic diagram illustrating a configuration of the information processing system 10B that performs the reading processing of the composite two-dimensional code 300 according to an embodiment of the present invention.

The information processing system 10B includes an information terminal 11B and a color filter 13B. The information terminal 11B can capture the printed matter 410, the article 510, or the image 420 including the composite two-dimensional code 300 through the color filter 13B, and can acquire the information included in the composite two-dimensional code 300.

The color filter 13B can transmit light of a predetermined color. When the color filter 13B that transmits the light of the first color overlaps the composite two-dimensional code 300, only the light of the first color is transmitted in a margin having total reflection and the first cells having the first color. Therefore, the margin and the first cell 301 appear to be the same color (that is, the first cell 301 appears to be deleted), resulting in a background having the first color. Further, since light other than the first color is absorbed by the color filter 13B in the second cells 302 having the second color and the third cells 303 having the third color, the light transmitted and absorbed by the color filter 13B is decreased and becomes dark. As a result, the second cells 302 and the third cells appear to have almost the same color (Here, for convenience, the color is described as a fourth color). Therefore, the composite two-dimensional code 300 overlapping the color filter 13B that transmits the light of the first color is converted into a two-dimensional code that includes the background having the first color and the cells having the fourth color. This process corresponds to the second filtering processing of the First Embodiment.

Similarly, when the color filter 13B that transmits the light of the second color overlaps the composite two-dimensional code 300, only the light of the second color is transmitted in the margin having total reflection and the second cells having the second color. Therefore, the margin and the second cell 302 appear to be the same color (that is, the second cell 302 appears to be deleted), resulting in a background having the second color. Further, since light other than the second color is absorbed by the color filter 13B in the first cells 301 having the first color and the third cells 303 having the third color, the light transmitted by the color filter 13B is decreased and becomes dark. As a result, the first cells 301 and the third cells 303 appear in the fourth color. Therefore, the composite two-dimensional code 300 overlapping the color filter 13B that transmits the light of the second color is converted into a two-dimensional code that includes the background having the second color and the cells having the fourth color. This process corresponds to the first filtering processing of the First Embodiment. Therefore, in the following description, the process of overlapping the color filter 13B that transmits the second color is described as the first filtering processing, and the process of overlapping the color filter 13B that transmits the first color is described as the second filtering processing.

As shown in FIG. 10, the information terminal 11B of the information processing system 10B includes the imaging unit 110 and the display section 120.

Figure 11:
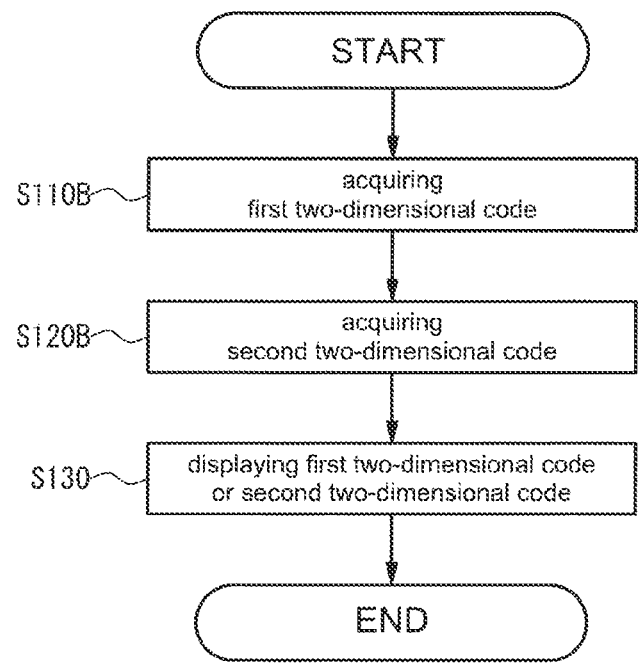
FIG. 11 is a flowchart of a reading processing of a composite two-dimensional code according to an embodiment of the present invention.

FIG. 11 is a flowchart of a reading processing of the composite two-dimensional code 300 according to an embodiment of the present invention.

The reading processing of the composite two-dimensional code 300 starts when a program for reading the composite two-dimensional code 300 is executed in the information processing system 10B.

In step S110B, the imaging unit 110 generates image data 310B-1 from the printed matter 410, the article 510, or the image 420 including the composite two-dimensional code 300, on which the first filtering processing is performed by the color filter 13B. A first two-dimensional code 320-1 is included in the image data 310B-1. That is, the first two-dimensional code 320-1 is acquired in step S110B.

In step S120B, the imaging unit 110 generates image data 310B-2 from the printed matter 410, article 510, or image 420 containing the composite two-dimensional code 300, on which the second filtering processing is performed by the color filter 13B. A second two-dimensional code 320-2 is included in the image data 310B-2. That is, the second two-dimensional code 320-2 is acquired in step S120B.

In step S130, the display unit 120 displays the first two-dimensional code 320-1 or the second two-dimensional code 320-2. The user can obtain the information included in the first two-dimensional code 320-1 or second two-dimensional code 320-2 based on the displayed first two-dimensional code 320-1 or second two-dimensional code 320-2.

The reading processing of the composite two-dimensional code 300 ends when step S130 is executed.

Modification of Third Embodiment

In the reading processing of the composite two-dimensional code 300 according to the Third Embodiment described above, the information terminal 11B acquires the first two-dimensional code 320-1 and the second two-dimensional code 320-2. In this modification, the information terminal 11B further acquires information included in the first two-dimensional code 320-1 and information included in the second two-dimensional code 320-2. In this case, in step S130, the display unit 120 displays the information included in the first two-dimensional code 320-1 or the information included in the second two-dimensional code 320-2 instead of the first two-dimensional code 320-1 or the second two-dimensional code 320-2. The user can directly obtain the information included in the composite two-dimensional code 300 from the composite two-dimensional code 300. In addition, the information accompanying the first two-dimensional code 320-1 or the second two-dimensional code can be provided to the user.

As described above, even in the reading processing of the composite two-dimensional code 300 according to this embodiment, information can only be obtained by executing the filtering processing to separate the combined two-dimensional code into individual codes. Therefore, not only mechanical duplication of the two-dimensional code but also electronic duplication of the two-dimensional code can be prevented.

Fourth Embodiment

A reading processing of the composite two-dimensional code 300, which is different from the First to Third Embodiments, is described with reference to FIG. 12. Specifically, in the following description, details of a first filtering processing and a second filtering processing are described. Although the reading processing of the composite two-dimensional code 300 in this embodiment can be executed using the information processing system 10, the first acquisition section 101 and the second acquisition section 102 included in the control unit 100 can execute further functions. In the following description, descriptions of configurations similar to those described above may be omitted.

The first acquisition section 101 acquires an RGB value of each of the second cells 302 and the third cells 303 from the image data 310, and the color of each of the second cells 302 and the third cells 303 can be converted to the third color when the acquired RGB value is within a predetermined range.

The second acquisition section 102 acquires an RGB value of each of the first cells 301 and the third cells 303 from the image data 310, and the color of each of the first cells 301 and the third cells 303 can be converted to the third color when the acquired RGB value is within a predetermined range.

Figure 12:
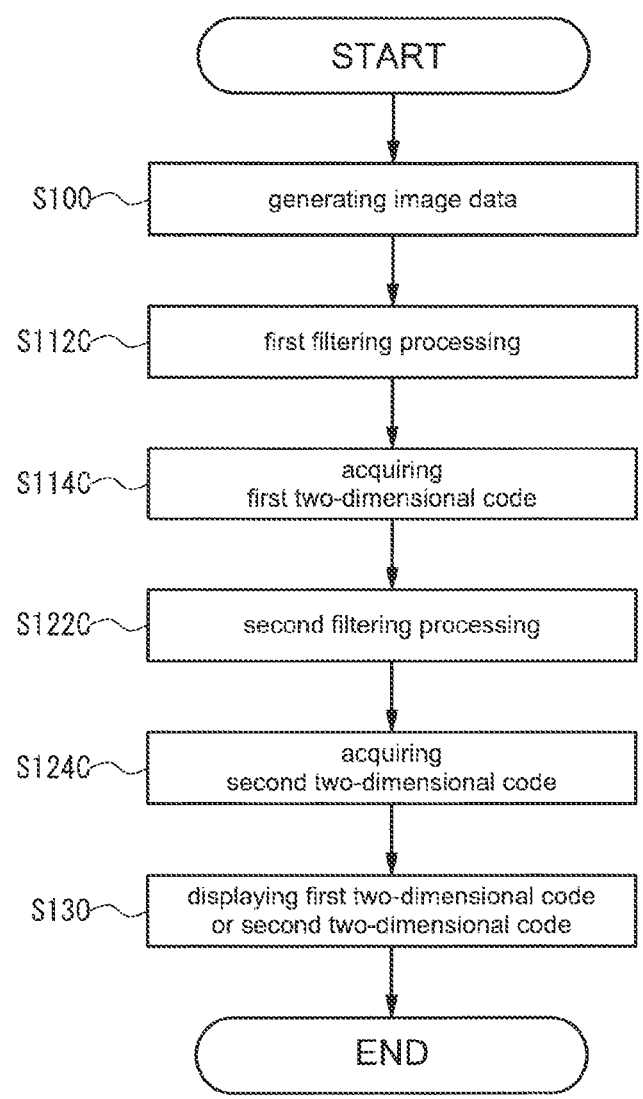
FIG. 12 is a flowchart of a reading processing of a composite two-dimensional code according to an embodiment of the present invention.

FIG. 12 is a flowchart of a reading processing of the composite two-dimensional code 300 according to an embodiment of the present invention.

The reading processing of the composite two-dimensional code 300 starts when a program for reading the composite two-dimensional code 300 is executed in the information processing system 10.

In step S112C, the first acquisition section 101 executes the first filtering processing on the image data 310. Due to differences in information terminals 11 or differences in capturing methods or capturing conditions, the color of each of the first cells 301, second cells 302, and third cells 303 of image data 310 may have variations in hue, saturation, or brightness, etc. Therefore, in the first filtering processing in this embodiment, the filtering processing is executed taking into account the variations in each color. Specifically, when the RGB value $(R_2, G_2, B_2)$ of the second cell 302 acquired from the image data 310 is in the vicinity of the preset RGB value of the second color, the RGB value $(R_2, G_2, B_2)$ of the second cell 302 is converted into the RGB value of a preset third color. For example, in the case that the second color and the third color are set to green (RGB value (0, 128, 0)) and black (RGB value (0, 0, 0)), respectively, when $G_2$ of the RGB value $(R_2, G_2, B_2)$ of the second cell 302 is within the range of $128-c_2 \leq G_2 \leq 128+c_2'$, the RGB value $(R_2, G_2, B_2)$ of the second cell 302 is converted into the RGB value (0,0,0) of black. That is, the color of the second cell 302 is converted to black, which is the preset third color, regardless of variations. Here, $c_2$ and $c_2'$ are preset values in advance, and can be set to arbitrary values such as 5, 10, or 20, for example. In addition, $c_2$ and $c_2'$ may be the same value or may be different values.

Specifically, when the RGB value $(R_3, G_3, B_3)$ of the third cell 303 acquired from the image data 310 is in the vicinity of the preset RGB value of the third color, the RGB value $(R_3, G_3, B_3)$ of the third cell 303 is converted into the RGB value of the preset third color. For example, in the case that the third color is set to black (RGB value (0, 0, 0)), when $R_3$, $G_3$, and $B_3$ of the RGB value $(R_3, G_3, B_3)$ of the third cell 303 are within the range of $0 \leq R_3, G_3,$ and $B_3 \leq c_3$, the RGB value $(R_3, G_3, B_3)$ of the third cell 303 is converted into the RGB values (0,0,0) of black. That is, the color of the third cell 303 is converted to black, which is the preset third color, regardless of variations. Here, $c_3$ is a preset value in advance, and can be set to an arbitrary value such as 5, 10, or 20, for example. In addition, $c_3$ may be the same value or may be different values for each of $R_3$, $G_3$, and $B_3$.

Then, the RGB values of cells other than the cells converted to the third color are converted to the RGB value of the background color, for example, the RGB value (255, 255, 255) of white.

Further, the color of the three cutout symbols 304 may be converted to the preset third color.

Therefore, in the first filtering processing in step S112C, each of all the cells is converted to either the third color (e.g., black) or the background color (e.g., white).

In step S114C, the first acquisition section 101 acquires the first two-dimensional code 320-1 generated by the first filtering processing. The first two-dimensional code 320-1 includes the plurality of second cells 302 and the plurality of third cells 303 having the third color, and the three cutout symbols 304 having the third color.

In step S122C, the second acquisition section 102 executes the second filtering processing on the image data 310. Specifically, when the RGB value $(R_2, G_2, B_2)$ of the first cell 301 acquired from the image data 310 is in the vicinity of the preset RGB value of the first color, the RGB value $(R_1, G_1, B_1)$ of the first cell 302 is converted into the RGB value of a preset third color. For example, in the case that the first color and the third color are set to red (RGB value (255, 0, 0)) and black (RGB value (0, 0, 0)), respectively, when $R_1$ of the RGB value $(R_1, G_1, B_1)$ of the first cell 301 is within the range of $255-c_1 \leq R_1 \leq 255$, the RGB value $(R_1, G_1, B_1)$ of the first cell 301 is converted into the RGB value (0,0,0) of black. That is, the color of the first cell 301 is converted to black, which is the preset third color, regardless of variations. Here, $c_1$ is a preset value in advance, and can be set to arbitrary values such as 5, 10, or 20, for example.

Further, in the same case of S112, when the RGB value $(R_3, G_3, B_3)$ of the third cell 303 included in the image data 310 is in the vicinity of the preset RGB value of the third color, the RGB value $(R_3, G_3, B_3)$ of the third cell 303 is converted into the RGB value of the preset third color. Then, the RGB values of cells other than the cells converted to the third color are converted to the RGB value of the background color, for example, the RGB value (255, 255, 255) of white. Further, the color of the three cutout symbols 304 may be converted to the preset third color.

Therefore, in the first filtering processing in step S122C, each of all the cells is converted to either the third color (e.g., black) or the background color (e.g., white).

In step S124C, the second acquisition section 102 acquires the second two-dimensional code 320-2 generated by the second filtering processing. The second two-dimensional code 320-2 includes the plurality of first cells 301 and the plurality of third cells 303 having the third color, and the three cutout symbols 304 having the third color.

After step S124C, step S130 is executed. The reading processing of the composite two-dimensional code 300 ends when step S130 is executed.

As described above, in the reading processing of the composite two-dimensional code 300 according to this embodiment, the first two-dimensional code 320-1 and the second two-dimensional code 320-2 can acquire the two-dimensional codes with two colors of the third color and the background color, regardless of variations in the color. Therefore, not only mechanical duplication of the two-dimensional code but also electronic duplication of the two-dimensional code can be prevented.

Further, since the first two-dimensional code 320-1 and the second two-dimensional code 320-2 displayed in step S130 are the two-dimensional codes having two colors, a special reading device is not required to read the first two-dimensional code 320-1 and the second two-dimensional code 320-2.

Fifth Embodiment

A reading processing of a composite two-dimensional code 300D, which is different from the First to Fourth Embodiments, is described with reference to FIGS. 13 to 15. In this embodiment, the composite two-dimensional code 300D shown in FIG. 13 is used.

Figure 13:
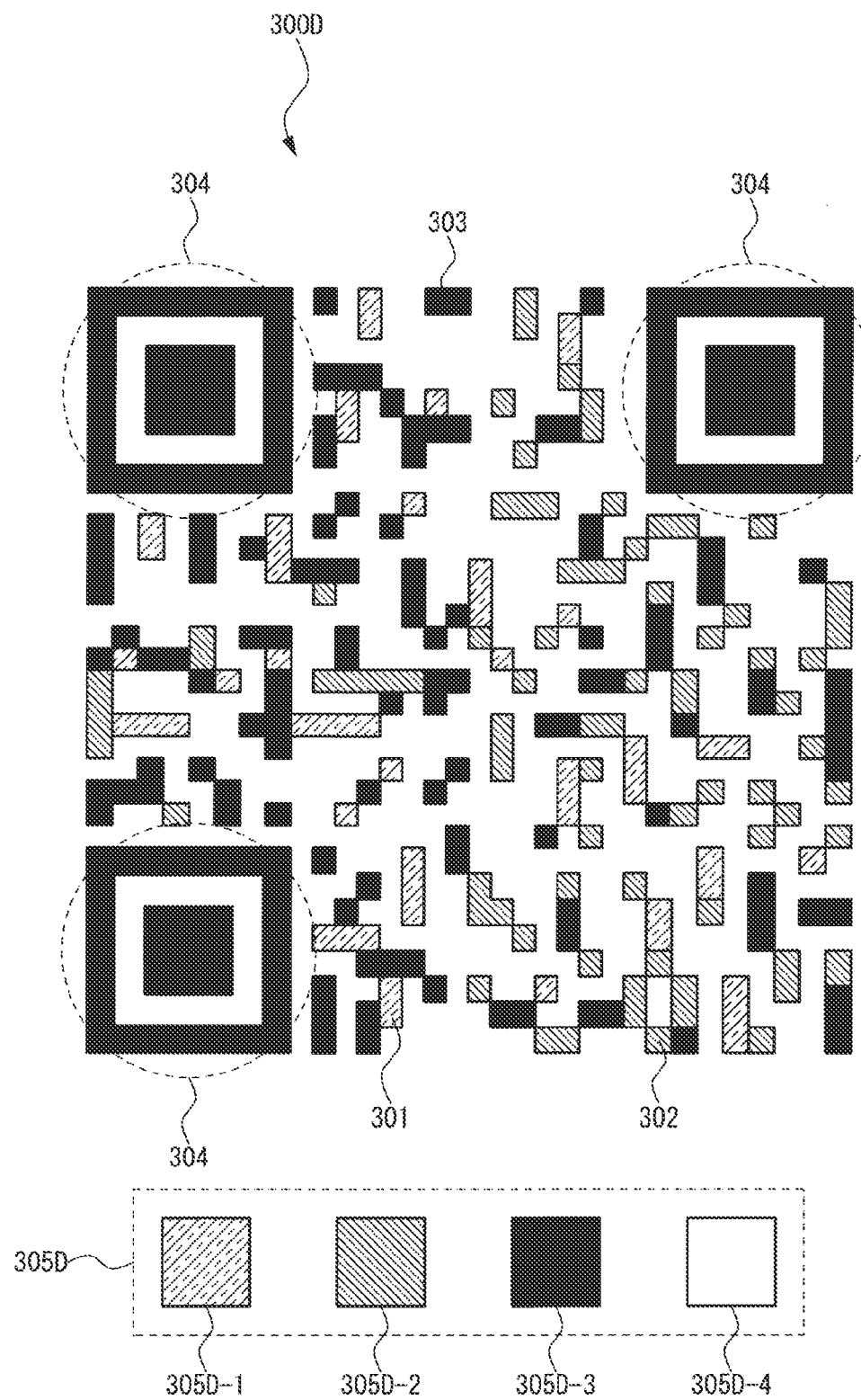
FIG. 13 is a schematic diagram showing a configuration of a composite two-dimensional code according to an embodiment of the present invention.

FIG. 13 is a schematic diagram showing a configuration of the composite two-dimensional code 300D according to an embodiment of the present invention.

As shown in FIG. 13, the composite two-dimensional code 300D includes the plurality of first cells 301 having the first color, the plurality of second cells 302 having the second color, the plurality of third cells 303 having the third color, the three cutout symbols 304 having the third color, and a color code pattern portion 305D. In addition, in this embodiment, a portion including the plurality of first cells 301 having the first color, the plurality of second cells 302 having the second color, the plurality of third cells 303 having the third color, and the three cutout symbols 304 having the third color may be referred to as a cell pattern portion.

The color code pattern portion 305D is arranged outside the first cells 301, the second cells 302, the third cells 303, and the cutout symbols 304. The color code pattern portion 305D includes a first color code 305D-1, a second color code 305D-2, a third color code 305D-3, and a fourth color code 305D-4. The first color code 305D-1, the second color code 305D-2, and the third color code 305D-3 are the first color of the first cells 301, the second color of the second cells 302, and the third color of the third cells 303, respectively. That is, the first color code 305D-1, the second color code 305D-2, and the third color code 305D-3 respectively have the first color, the second color, and the third color. Further, the fourth color code 305D-4 has the background color.

The reading processing of the composite two-dimensional code 300D in this embodiment can be executed using an information processing system 10D. In addition, in the following description, when a configuration of the information processing system 10D is similar to the configuration of the information processing system 10, the description of the configuration of the information processing system 10D may be omitted.

Figure 14:
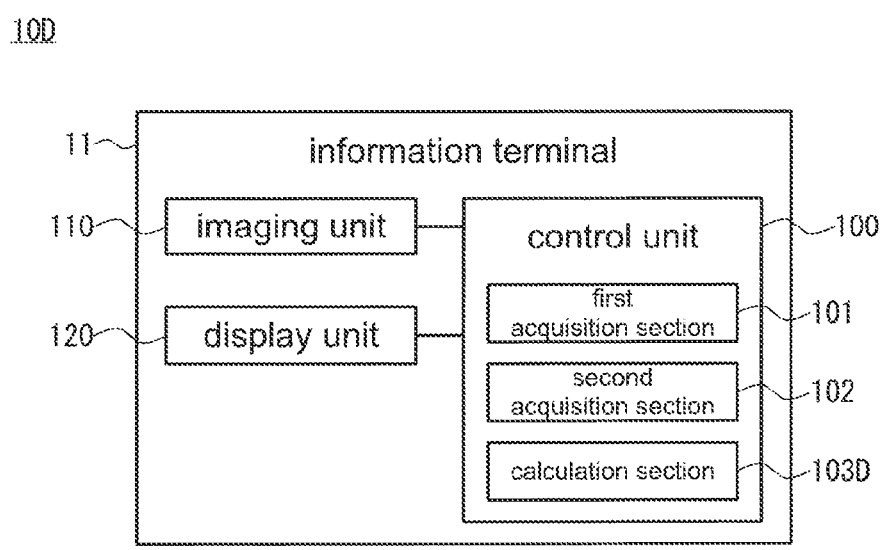
FIG. 14 is a block diagram showing a configuration of an information processing system 10D that executes a reading processing of a composite two-dimensional code in an embodiment of the present invention.

FIG. 14 is a block diagram showing the configuration of the information processing system 10D that executes a reading processing of the composite two-dimensional code 300D in an embodiment of the present invention.

As shown in FIG. 14, the control unit 100 of the information processing system 10D includes the first acquisition section 101, the second acquisition section 102, and a calculation section 103D.

The calculation section 103D can acquire the respective RGB values of the first color code 305D-1, the second color code 305D-2, the third color code 305D-3, and the fourth color code 305D-4 of the color code pattern portion 305D from the image data 310. Further, the calculation section 103D can calculate a difference value between the acquired RGB value and the RGB value of the preset color. Furthermore, the calculation section 103D can add the calculated difference value to the RGB value acquired from the image data 310.

Next, details of a color correction processing of the image data 310 are described with reference to FIG. 15. In addition, in the following description, descriptions of configurations similar to those described above may be omitted. Further, in the following description, for convenience, although the color correction processing of the image data 310 is described as a processing different from the first filtering processing and the second filtering processing, the color correction processing of the image data 310 may be included in at least one of the first filtering processing and the second filtering processing.

Figure 15:
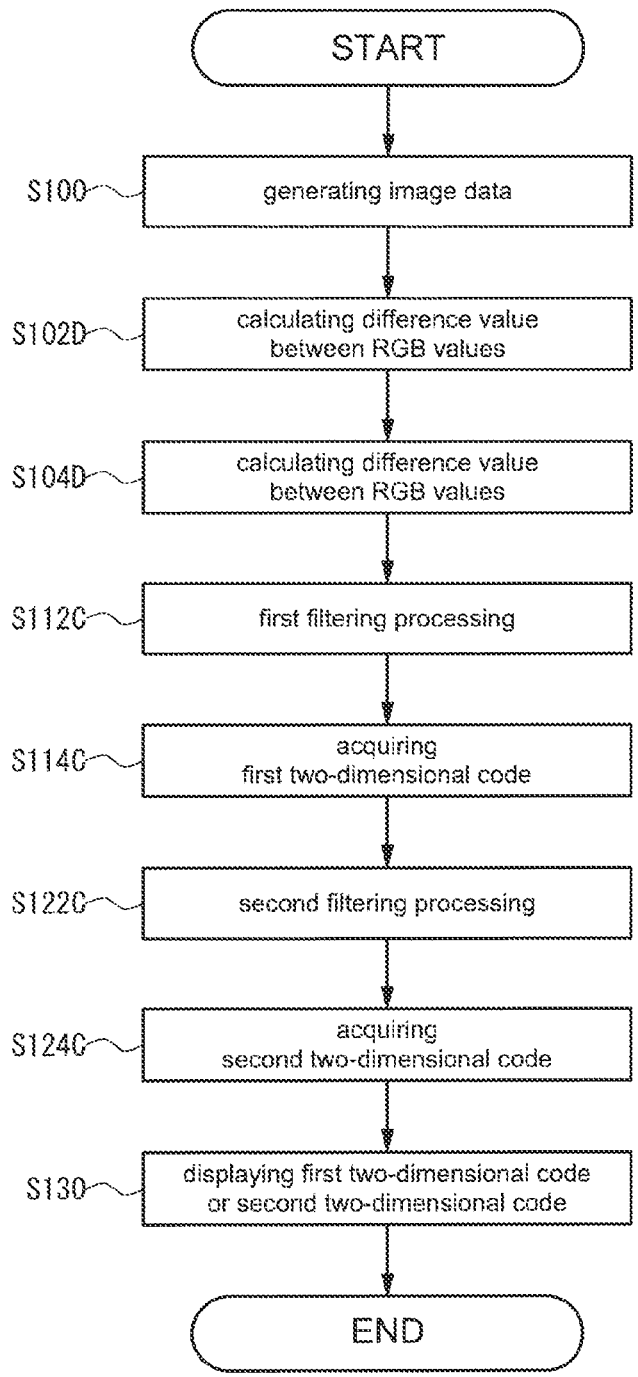
FIG. 15 is a flowchart of a reading processing of a composite two-dimensional code according to an embodiment of the present invention.

FIG. 15 is a flowchart of a reading processing of the composite two-dimensional code 300D according to an embodiment of the present invention.

The reading processing of the composite two-dimensional code 300D starts when a program for reading the composite two-dimensional code 300D is executed in the information processing system 10.

In step S102D, the calculation section 103D acquires the respective RGB values of the first color code 305D-1, the second color code 305D-2, the third color code 305D-3, and the fourth color code 305D-4 of the color code pattern portion 305D from the image data 310. Further, the calculation section 103D calculates a difference value between the preset RGB value of the first color and the RGB value of the acquired first color code 305D-1 (hereinafter referred to as "first difference value"). Similarly, the calculation section 103D calculates a difference value between the preset RGB value of the second color and the acquired RGB value of the second color code 305D-2 (hereinafter referred to as "second difference value"), a difference value between the preset RGB value of the third color and the acquired RGB value of the third color code 305D-3 (hereinafter referred to as the "third difference value"), and a difference value between the preset RGB value of the background color and the acquired RGB value of the fourth color code 305D-4 (hereinafter referred to as "fourth difference value"). Thereby, it is possible to detect a difference between the color of the composite two-dimensional code 300D and the color of the image data 310 due to a difference in the information terminal 11 or a difference in the capturing methods or the capturing conditions.

In step S104D, the calculation section 103D corrects the colors of the first cells 301, the second cells 302, the third cells 303, and the cutout symbols and the background color of the image data 310 based on the first difference value, the second difference value, the third difference value, and the fourth difference value. Specifically, the first difference value is added to the RGB values of the first cells 301 acquired from the image data 310. Similarly, the second difference value is added to the RGB values of the second cells 302, the third difference value is added to the RGB values of the third cells 303 and the cutout symbol 304, and the fourth difference value is added to the RGB value of the background color. As a result, the colors of the image data 310 are corrected and can be made closer to the color of the composite two-dimensional code 300D.

After step 104D, step S112C is executed. However, since the subsequent steps are described in the Fourth Embodiment, description thereof is omitted in the following description. In addition, the steps after S110 described in the First Embodiment can also be executed instead of the steps after step S112C. In this case, the first two-dimensional code 320-1 and the second two-dimensional code 320-2 having colors similar to the composite two-dimensional code 300 can be displayed in step S130.

In addition, in this embodiment, the first filtering processing and the second filtering processing may be executed using the respective RGB values of the acquired first color code 305D-1, second color code 305D-2, third color code 305D-3, and fourth color code 305D-4 as a reference without the color correction processing of the image data 310.

Modification of Fifth Embodiment

A configuration of the color code portion included in the composite two-dimensional code 300D is not limited to the color code portion 305D shown in FIG. 13. Another configuration of the color code portion is described with reference to FIGS. 16A and 16B.

Figure 16A:
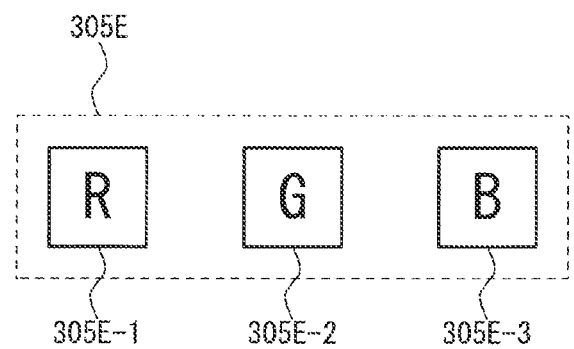
FIG. 16A is a schematic diagram showing a configuration of another color code portion included in a composite two-dimensional code according to an embodiment of the present invention.
Figure 16B:
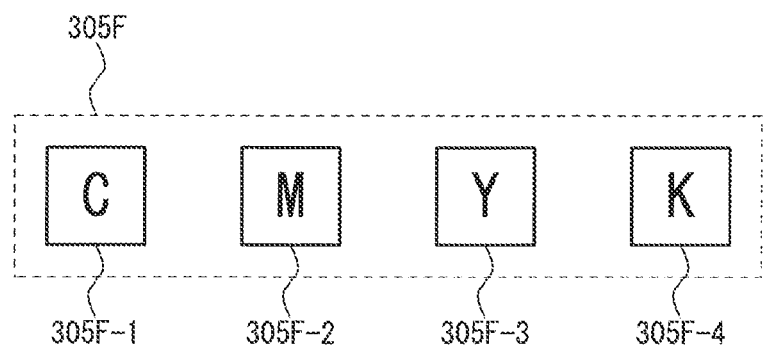
FIG. 16B is a schematic diagram showing a configuration of another color code portion included in a composite two-dimensional code according to an embodiment of the present invention.

FIGS. 16A and 16B are schematic diagrams showing configurations of another color code portion included in the composite two-dimensional code 300D according to an embodiment of the present invention.

A color code portion 305E shown in FIG. 16A includes a first color code 305E-1, a second color code 305E-2, and a third color code 305E-3. The first color code 305E-1, the second color code 305E-2, and the third color code 305E-3 are red (R), green (G), and blue (B), respectively. Either of the first color code 305E-1, the second color code 305E-2, and the third color code 305E-3 are different from the first color of the first cells 301, the second color of the second cells 302, and the third color of the third cells 303. Here, the RGB value of red (R) is (255, 0, 0), the RGB value of green (G) is (0, 255, 0), and the RGB value of blue (B) is (0, 0, 255). Therefore, when the RGB value of each of the first color code 305E-1, the second color code 305E-2, and the third color code 305E-3 are acquired from the image data 310 and the acquired first color code 305E-1, second color code 305E-2, and third color code 305E-3 correspond to red (R), green (G), and blue (B), respectively, a shift amount from the RGB value of red (R) (a difference value ΔR) can be calculated based on the RGB value of the acquired first color code 305E-1, a shift amount from the RGB value of green (G) (a difference value ΔG) can be calculated based on the RGB value of the acquired second color code 305E-2, and a shift amount from the RGB value of blue (B) (a difference value ΔB) can be calculated based on the RGB value of the acquired third color code 305E-3. Therefore, in either of the first cells 301, second cells 302, and third cells 303, the colors of the image data 310 are corrected and can be closer to the color of the composite two-dimensional code 300D by adding the difference values (ΔR, ΔG, and AB) to the RGB value of each of the cells.

The color code portion 305F shown in FIG. 16B includes a first color code 305F-1, a second color code 305F-2, a third color code 305F-3, and a fourth color code 305F-4. The first color code 305F-1, the second color code 305F-2, the third color code 305F-3, and the fourth color code 305F-4 are cyan (C), magenta (M), yellow (Y), and black (K), respectively. Either of the first color code 305F-1, the second color code 305F-2, the third color code 305F-3, and the fourth color code 305F-4 are different from the first color code of the first cell 301, the second color of the second cell 302, and the third color of the third cell 303. Here, for example, a CMYK value of cyan (C) is (100, 0, 0, 0), a CMYK value of magenta (M) is (0, 100, 0, 0), a CMYK value of yellow (Y) is (0, 0, 100, 0), and a CMYK value of black (K) is (0,0,0,100). Further, for example, an RGB value of cyan (C) is (0, 174, 239), an RGB value of magenta (M) is (255, 0, 255), an RGB value of yellow (Y) is (255, 255, 0), and an RGB value of black (K) is (0, 0, 0). In this case, the RGB value of each of the first color code 305F-1, second color code 305F-2, third color code 305F-3, and fourth color code 305F-4 is acquired from the image data 310, and difference values are calculated so that the acquired RGB values correspond to the RGB values of cyan (C), magenta (M), yellow (Y), and black (K), respectively. Specifically, the difference value ΔC of the first color code 305F-1, the difference value ΔM of the second color code 305F-2, the difference value ΔY of the third color code 305F-3, and the difference value ΔK of the fourth color code 305F-4 are represented as shown in Equation (1).

[Equation (1)]

$$\Delta C=(\Delta R_C, \Delta G_C, \Delta B_C)$$

$$\Delta M=(\Delta R_M, \Delta G_M, \Delta B_M)$$

$$\Delta Y=(\Delta R_Y, \Delta G_Y, \Delta B_Y)$$

$$\Delta K=(\Delta R_K, \Delta G_K, \Delta B_K) \qquad (1)$$

When the CMYK value of the preset color of the first cell 301 of the composite two-dimensional code 300D is ($C_1$, $M_1$, $Y_1$, $K_1$), the difference values ($\Delta R_1$, $\Delta G_1$, and $\Delta B_1$) of the RGB value of the first cell 301 acquired from the image data 310 can be calculated using Equation (2). Here, a is a weighting coefficient, which can be changed depending on the above-described preset CMYK values or RGB values of cyan (C), magenta (M), yellow (Y), and black (K).

[Equation 2]

$$\Delta R_1 = \alpha_R \times (C_1 \times \Delta R_C + M_1 \times \Delta R_M + Y_1 \times \Delta R_Y + K_1 \times \Delta R_K)$$

$$\Delta G_1 = \alpha_G \times (C_1 \times \Delta G_C + M_1 \times \Delta G_M + Y_1 \times \Delta G_Y + K_1 \times \Delta G_K)$$

$$\Delta B_1 = \alpha_B \times (C_1 \times \Delta B_C + M_1 \times \Delta B_M + Y_1 \times \Delta B_Y + K_1 \times \Delta B_K) \qquad (2)$$

Although Equation (2) is an equation for calculating the difference value of the RGB value of the first cell 301, the difference values of the RGB value of the second cell 302, the RGB value of the third cell 303, and the RGB value of the background color can be calculated similarly. Therefore, in either of the first cells 301, second cells 302, and third cells 303, the colors of the image data 310 are corrected and can be closer to the color of the composite two-dimensional code 300D by adding the difference values (ΔR, ΔG, and AB) to the RGB value of each of the cells.

As described above, in the reading processing of the composite two-dimensional code 300D according to the present embodiment, even when the colors of the image data 310 are different from the colors of the composite two-dimensional code 300, the first two-dimensional code 320-1 and the second two-dimensional code 320-2 can be corrected to have the colors close to the composite two-dimensional code 300. Therefore, not only mechanical duplication of the two-dimensional code but also electronic duplication can be prevented.

Sixth Embodiment

A reading processing of the composite two-dimensional code 300, which is different from the First to Fifth Embodiments, is described with reference to FIG. 17. Although the reading processing of the composite two-dimensional code 300 in this embodiment can be executed using the information processing system 10, the first acquisition section 101 and the second acquisition section 102 included in the control unit 100 can execute further functions. In the following description, descriptions of configurations similar to those described above may be omitted.

The first acquisition section 101 can read the first two-dimensional code 320-1 generated by the first filtering processing and acquire the information included in the first two-dimensional code 320-1.

The second acquisition section 102 can count the number of cells converted by the second filtering processing. Further, the second acquisition section 102 can determine whether a predetermined condition is satisfied based on the information acquired by the first acquisition section 101 and the information acquired by counting by the second acquisition section 102.

Figure 17:
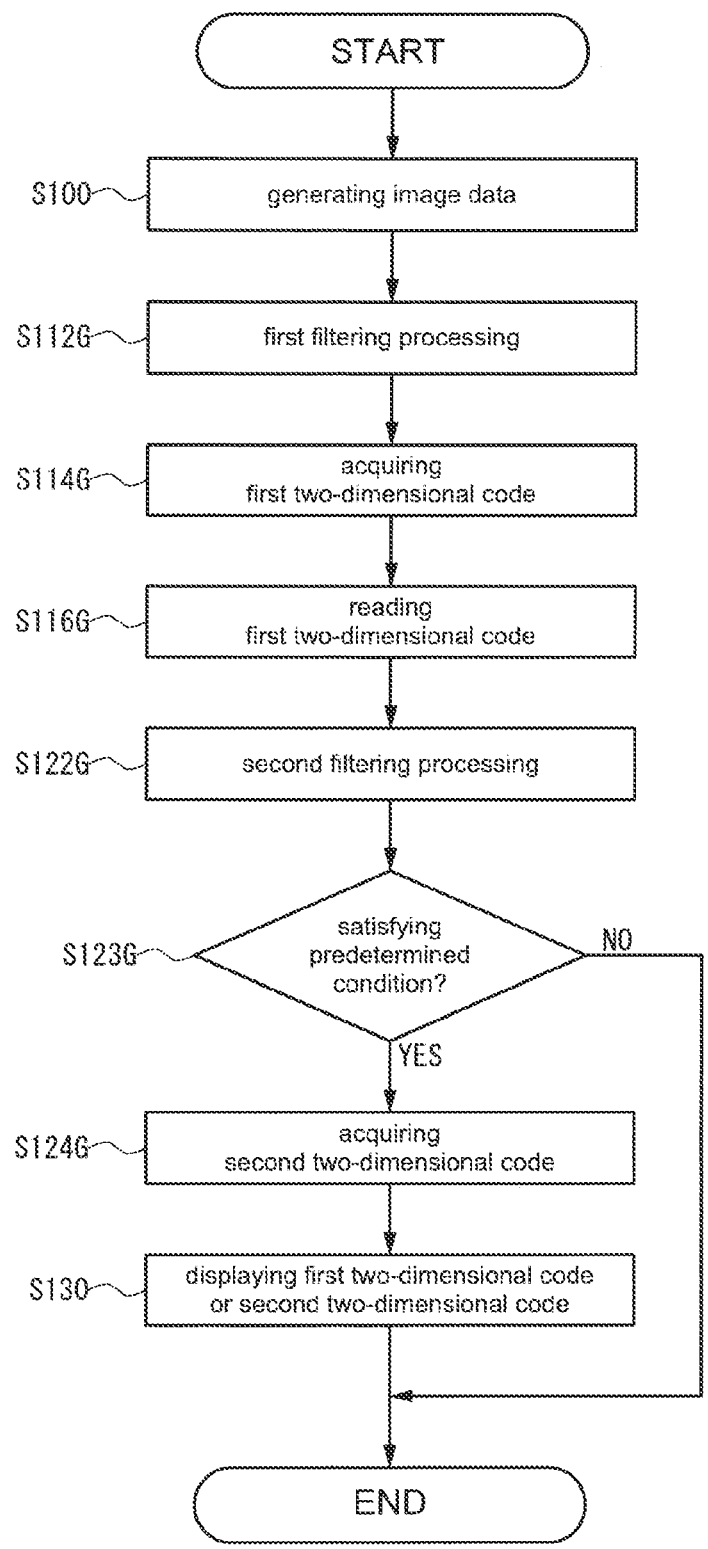
FIG. 17 is a flowchart of a reading processing of a composite two-dimensional code according to an embodiment of the present invention.

FIG. 17 is a flowchart of the reading processing of the composite two-dimensional code 300 according to an embodiment of the present invention.

The reading processing of the composite two-dimensional code 300 starts when a program for reading the composite two-dimensional code 300 is executed in the information processing system 10.

In step S112G, the first acquisition section 101 executes the first filtering processing on the image data 310. In this embodiment, for convenience, although the first filtering processing is described as the color reduction processing, the first filtering processing in this embodiment is not limited thereto.

In the first filtering processing, the second cell 302 having the second color is deleted from the image data 310. Specifically, the color of the second cell 302 is converted from the second color to the background color. In the first filtering processing, the first color of the first cell 301, the second color of the second cell 302, the third color of the third cell 303, and the background color may be adjusted. For example, the saturation of each of the first color and the second color may be adjusted, and the brightness of each of the third color and the background color may be adjusted. By adjusting each color in this way, the outline of the second cell 302 having the second color is highlighted, and the boundary of each of the first cell 301, the second cell 302, and the third cell 303 can be clearly defined. In this way, in the first filtering processing, the second cell 302 having the second color may be deleted from the adjusted image data 310 after the image data 310 is adjusted. In addition, when the background color is not white, the background color may be adjusted to white at the time the image data 310 is adjusted.

In step S114G, the first acquisition section 101 acquires the first two-dimensional code 320-1 generated by the first filtering processing. The first two-dimensional code 320-1 includes the plurality of first cells 301 having the first color, the plurality of third cells 303 having the third color, and the three cutout symbols 304 having the third color. In addition, in the acquired first two-dimensional code 320-1, the first color may be converted to the third color. That is, the acquired first two-dimensional code 320-1 may be a two-dimensional code converted into two colors that are the third color of the plurality of third cells 303 and three cutout symbols 304, and the background color.

In step S116G, the first acquisition section 101 reads the first two-dimensional code 320-1 to acquire the information included in the first two-dimensional code 320-1. Here, the first two-dimensional code 320-1 includes information regarding the number of first cells in the composite two-dimensional code 300 (hereinafter, referred to as "information on the number of first cells included"). That is, in step S116G, the information on the number of first cells included is acquired.

In step S122G, the second acquisition section 102 executes the second filtering processing on the image data 310. In this embodiment, for convenience, although the second filtering processing is described as a color reduction processing, the second filtering processing in this embodiment is not limited thereto.

In the second filtering processing, the first cell 301 having the first color is deleted from the image data 310. Specifically, the color of the first cell 301 is converted from the first color to the background color. In the second filtering processing, the first cell 301 having the first color may be deleted from the image data 310 adjusted by the first filtering processing. Further, in the second filtering processing, the number of deleted first cells 301 is counted. That is, in the second filtering processing, information regarding the number of deleted first cells 301 (hereinafter, referred to as "information on the number of first cells deleted") is acquired.

In step S123G, the second acquisition section 102 determines whether a predetermined condition is satisfied based on the information on the number of first cells included and the information on the number of first cells deleted. For example, the predetermined condition is whether or not the information on the number of first cells deleted is within the range of greater than or equal to (1−a) times the information on the number of first cells included and less than or equal to (1+a) times the information on the number of first cells included. Here, a is a preset value, and can be set to any value such as 0.05, 0.1, or 0.15, for example. When the predetermined condition is satisfied (step S123G: YES), step S124G is executed. On the other hand, when the predetermined condition is not satisfied (step S123G: NO), the reading processing of the composite two-dimensional code 300 ends. In this case, since the composite two-dimensional code 300 may be a forged code, an alert indicating that the composite two-dimensional code 300 cannot be read may be generated and provided to the user.

In step S124G, the first acquisition section 101 acquires the second two-dimensional code 320-2 generated by the second filtering processing. The second two-dimensional code 320-2 includes the plurality of second cells 302 having the second color, the plurality of third cells 303 having the third color, and the three cutout symbols 304 having the third color. In addition, in the acquired second two-dimensional code 320-2, the second color may be converted to a third color. That is, the acquired second two-dimensional code 320-2 may be a two-dimensional code converted into two colors that are the third color of the plurality of third cells 303 and three cutout symbols 304, and the background color.

After step S124G, step S130 is executed. The reading processing of the composite two-dimensional code 300 ends when step S130 is executed.

Modification 1 of Sixth Embodiment

The information on the number of first cells included in the first two-dimensional code 320-1 may not be one but more than 1. For example, the composite two-dimensional code 300 is divided into four regions that are three regions each including one cutout symbol 304 and one region not including the cutout symbol 304, and the information on the number of first cells included may be information regarding the number of first cells included in each of the four regions. In this case, in step S112C, the number of deleted first cells 301 is counted in each of the four regions of the image data 310 that correspond to the four regions of the composite two-dimensional code 300. That is, the information on the number of first cells deleted includes the number of deleted first cells 301 in each of the four regions.

In addition, the number of divided regions is not limited to four. Further, the plurality of regions may be continuous or discontinuous. Furthermore, the areas of the plurality of regions may be the same or different.

Further, in step S123G, it is determined whether or not the above-described predetermined conditions are satisfied in each of the four regions. Furthermore, in step S123G, a determination may be performed based on the determination result in the four regions. Specifically, when the number of regions determined to satisfy the predetermined condition is greater than or equal to a preset value, step S123G is executed and the second two-dimensional code 320-2 is acquired. On the other hand, when the number of regions determined to satisfy the predetermined condition is less than the preset value, the reading processing of the composite two-dimensional code 300 ends.

Modification 2 of Sixth Embodiment

The predetermined condition in step S123G is not limited to the condition based on the information on the number of first cells included and the information on the number of first cells deleted. For example, the first two-dimensional code 320-1 includes information regarding the percentage of the first cells to the rectangle surrounded by the three cutout symbols 304 of the composite two-dimensional code 300 (hereinafter, referred to as "information on percentage of first cells included"), and the information on the percentage of first cells included may be acquired in step S116G. In this case, in step S122G, information regarding the percentage of the deleted first cells 301 to the rectangle surrounded by the three cutout symbols 304 of the image data 310 (hereinafter, referred to as "information on percentage of first cells deleted") is acquired. Therefore, in step S123G, it is determined whether or not the information on the percentage of first cells deleted is within the range of greater than or equal to (1−a) times the information on the percentage of first cells included and less than or equal to (1+a) times the information on the percentage of first cells included.

Modification 3 of Sixth Embodiment

In step S116G, the first two-dimensional code 320-1 is not directly read, but the first two-dimensional code 320-1 may be read and the information on the number of first cells included may be acquired after a processing in which cells are added to the first two-dimensional code 320-1, or cells are deleted from the first two-dimensional code 320-1. In this case, a two-dimensional code in which cells are added to the preset region of the first two-dimensional code 320-1 or a two-dimensional code in which cells are deleted from the preset region of the first two-dimensional code 320-1 includes the information on the number of first cells included and the first two-dimensional code 320-1 can include other information.

Further, in step S116G, a predetermined region of the first two-dimensional code 320-1 may be extracted, and the information on the number of first cells included may be acquired based on a region pattern of the extracted region. For example, even when a database in which the region pattern is associated with the information on the number of first cells included is registered in advance, and the information on the number of first cells included may be acquired by comparing the region pattern of the extracted region with the database.

As described above, in the reading processing of the composite two-dimensional code 300 according to the present embodiment, when the second two-dimensional code 320-2 is acquired, a parameter in a predetermined determination condition is acquired based on the information included in the generated first two-dimensional code 320-1 or the information acquired using the generated first two-dimensional code 320-1 and the determination whether or not the predetermined determination condition is satisfied is executed. Therefore, when the predetermined condition is satisfied, the second two-dimensional code 320-2 can be acquired. Therefore, not only mechanical duplication of the two-dimensional code but also electronic duplication can be prevented.

Each of the embodiments described above as an embodiment of the present invention can be appropriately combined and implemented as long as they do not contradict each other. Additions, deletions, or design changes of constituent elements, or additions, omissions, or changes to conditions of steps as appropriate based on the respective embodiments are also included within the scope of the present invention as long as the gist of the present invention is provided.

Further, other effects which differ from those brought about by each of the embodiments described above, but which are apparent from the description herein or which can be readily predicted by those skilled in the art, are naturally understood to be brought about by the present invention.

What is claimed is:

1. A composite two-dimensional code in which a first two-dimensional code and a second two-dimensional code are combined, comprising:
   a first cell having a first color;
   a second cell having a second color; and
   a third cell having a third color,
   wherein the first color, the second color, and the third color are different from each other,
   wherein the first two-dimensional code is acquired by a first filtering processing,
   wherein the second two-dimensional code is acquired by a second filtering processing,
   wherein the first filtering processing is a processing of converting the second cell having the second color of the composite two-dimensional code,
   wherein the second filtering processing is a processing of converting the first cell having the first color,
   wherein the first two-dimensional code comprises the first cell having the first color and the third cell having the third color,
   wherein the second two-dimensional code comprises the second cell having the second color and the third cell having the third color, and
   wherein the first two-dimensional code comprises count information about a number of first cells having the first color in the composite two-dimensional code.

2. The composite two-dimensional code according to claim 1,
   wherein the first filtering processing is a color reduction processing or a color addition processing of the second color, and
   wherein the second filtering processing is a color reduction processing or a color addition processing of the first color.

3. The composite two-dimensional code according to claim 1, further comprising a color code pattern portion different from the first cell, the second cell, and the third cell,
   wherein the color code pattern portion comprises:
      a first color code having a fourth color;
      a second color code having a fifth color; and
      a third color code having a sixth color,
   wherein the fourth color, the fifth color, and the sixth color are different from each other,
   wherein the first two-dimensional code is acquired by the first filtering processing further comprising a color correction based on at least one of the first color code, the second color code, or the third color code, and
   wherein the second two-dimensional code is acquired by the second filtering processing further comprising a color correction based on at least one of the first color code, the second color code, or the third color code.

4. The composite two-dimensional code according to claim 3, wherein the first color, the second color, and the third color are identical to the fourth color, the fifth color, and the sixth color, respectively.

5. The composite two-dimensional code according to claim 3, wherein the fourth color, the fifth color, and the six color are red, green, and blue, respectively.

6. The composite two-dimensional code according to claim 3, wherein the fourth color, the fifth color, and the six color are cyan, magenta, and yellow, respectively.

7. The composite two-dimensional code according to claim 1, wherein the first color is a complementary color of the second color.

8. The composite two-dimensional code according to claim 1, wherein the third color is black.

9. A composite two-dimensional code in which a first two-dimensional code and a second two-dimensional code are combined, comprising:
   a first cell having a first color;
   a second cell having a second color; and
   a third cell having a third color,
   wherein the first color, the second color, and the third color are different from each other,
   wherein the first two-dimensional code is acquired by a first filtering processing,
   wherein the second two-dimensional code is acquired by a second filtering processing,
   wherein the first filtering processing is a processing of converting the second cell having the second color of the composite two-dimensional code,
   wherein the second filtering processing is a processing of converting the first cell having the first color,
   wherein the first two-dimensional code comprises the first cell having the first color and the third cell having the third color,
   wherein the second two-dimensional code comprises the second cell having the second color and the third cell having the third color, and
   wherein the first two-dimensional code comprises percentage information about a percentage of first cells having the first color in the composite two-dimensional code.

10. The composite two-dimensional code according to claim 9,
   wherein the first filtering processing is a color reduction processing or a color addition processing of the second color, and
   wherein the second filtering processing is a color reduction processing or a color addition processing of the first color.

11. The composite two-dimensional code according to claim 9, further comprising a color code pattern portion different from the first cell, the second cell, and the third cell,
   wherein the color code pattern portion comprises:
      a first color code having a fourth color;
      a second color code having a fifth color; and
      a third color code having a sixth color,
   wherein the fourth color, the fifth color, and the sixth color are different from each other,
   wherein the first two-dimensional code is acquired by the first filtering processing further comprising a color correction based on at least one of the first color code, the second color code, or the third color code, and
   wherein the second two-dimensional code is acquired by the second filtering processing further comprising a color correction based on at least one of the first color code, the second color code, or the third color code.

12. The composite two-dimensional code according to claim 11, wherein the first color, the second color, and the third color are identical to the fourth color, the fifth color, and the sixth color, respectively.

13. The composite two-dimensional code according to claim 11, wherein the fourth color, the fifth color, and the six color are red, green, and blue, respectively.

14. The composite two-dimensional code according to claim 11, wherein the fourth color, the fifth color, and the six color are cyan, magenta, and yellow, respectively.

15. The composite two-dimensional code according to claim 9, wherein the first color is a complementary color of the second color.

16. The composite two-dimensional code according to claim 9, wherein the third color is black.

* * * * *